US011671317B2

United States Patent
Zhuo et al.

(10) Patent No.: US 11,671,317 B2
(45) Date of Patent: Jun. 6, 2023

(54) OBJECTIVE DRIVEN DYNAMIC OBJECT PLACEMENT OPTIMIZATION

(71) Applicant: Huawei Cloud Computing Technologies Co., Ltd., Gui'an (CN)

(72) Inventors: Donghui Zhuo, Bellevue, WA (US);
Quinton Hoole, Bellevue, WA (US);
Isaac Ackerman, Bellevue, WA (US);
Sungwook Moon, Bellevue, WA (US);
Haibin Xie, Bellevue, WA (US);
Olesya Melnichenko, Bellevue, WA (US)

(73) Assignee: Huawei Cloud Computing Technologies Co., Ltd., Gui'an New District (CN)

( * ) Notice: Subject to any disclaimer, the term of this patent is extended or adjusted under 35 U.S.C. 154(b) by 168 days.

(21) Appl. No.: 15/929,317

(22) Filed: Apr. 24, 2020

(65) Prior Publication Data

US 2020/0252275 A1     Aug. 6, 2020

Related U.S. Application Data

(63) Continuation of application No. PCT/CN2019/083341, filed on Apr. 19, 2019.

(Continued)

(51) Int. Cl.
*H04L 41/0813* (2022.01)
*H04L 41/0823* (2022.01)
(Continued)

(52) U.S. Cl.
CPC ...... *H04L 41/0813* (2013.01); *H04L 41/0823* (2013.01); *H04L 41/12* (2013.01); *H04L 67/148* (2013.01); *Y02D 10/00* (2018.01)

(58) Field of Classification Search
CPC . H04L 41/0813; H04L 41/0823; H04L 41/12; H04L 67/148; Y02D 10/00; G06F 12/0207; G06F 12/06
See application file for complete search history.

(56) References Cited

U.S. PATENT DOCUMENTS

| 8,165,386 | B1 * | 4/2012 | Moon | G06V 10/94 |
| | | | | 706/15 |
| 2009/0254660 | A1 * | 10/2009 | Hanson | H04L 12/10 |
| | | | | 709/226 |

(Continued)

FOREIGN PATENT DOCUMENTS

| CN | 101308468 A | 11/2008 |
| CN | 105159736 A | 12/2015 |

(Continued)

OTHER PUBLICATIONS

"International Application No. PCT/CN2019/083341, International Search Report and Written Opinion dated Jul. 23, 2019", (Jul. 23, 2019), 9 pgs.

*Primary Examiner* — Tonia L Dollinger
*Assistant Examiner* — Joseph M Cousins
(74) *Attorney, Agent, or Firm* — Schwegman Lundberg & Woessner, P.A.

(57) ABSTRACT

A computer-implemented method for placement of a plurality of application objects of an application within a network architecture is disclosed. The method includes generating during runtime of the application, an application topology model for the application, based on application metrics for the plurality of application objects. A resource topology model of a plurality of network nodes within the network (Continued)

architecture is generated based on resource metrics for the network nodes. A recommendation is generated for migrating an application object of the plurality of application objects to a network node of the plurality of network nodes using the application topology model and the resource topology model, the recommendation identifying the application object and the network node. The application object is migrated to the network node identified by the recommendation.

20 Claims, 18 Drawing Sheets

Related U.S. Application Data

(60) Provisional application No. 62/782,034, filed on Dec. 19, 2018, provisional application No. 62/749,842, filed on Oct. 24, 2018.

(51) Int. Cl.
    *H04L 41/12* (2022.01)
    *H04L 67/148* (2022.01)

(56) References Cited

U.S. PATENT DOCUMENTS

| | | | |
|---|---|---|---|
| 2009/0271588 A1 | 10/2009 | Barsness et al. | |
| 2010/0318999 A1* | 12/2010 | Zhao | G06F 9/5044 718/104 |
| 2011/0282982 A1* | 11/2011 | Jain | G06F 9/5094 709/223 |
| 2011/0320520 A1* | 12/2011 | Jain | G06F 9/5072 709/224 |
| 2013/0067089 A1* | 3/2013 | Synytskyy | G06F 9/485 709/226 |
| 2014/0215035 A1* | 7/2014 | Anderson | G06F 9/5088 709/223 |
| 2016/0316003 A1* | 10/2016 | Snider | H04L 47/70 |
| 2017/0068747 A1* | 3/2017 | Qi | G06F 11/3452 |
| 2018/0089002 A1* | 3/2018 | Xia | G06F 1/3296 |
| 2018/0287956 A1* | 10/2018 | Bryc | H04L 67/32 |
| 2021/0097039 A1* | 4/2021 | Denyer | H04L 41/14 |

FOREIGN PATENT DOCUMENTS

| | | |
|---|---|---|
| CN | 106603592 A | 4/2017 |
| WO | WO-2017095382 A1 | 6/2017 |

* cited by examiner

OBJECTIVE DRIVEN DYNAMIC OBJECT PLACEMENT OPTIMIZATION

CROSS REFERENCE TO RELATED APPLICATIONS

This application is a continuation application of International Application No. PCT/CN2019/083341, filed Apr. 19, 2019, which claims priority to U.S. Provisional Application 62/749,842, filed Oct. 24, 2018 and entitled "Objective Driven Dynamic Object Placement Optimization," and U.S. Provisional Application 62/782,034, filed Dec. 19, 2018 and entitled "Objective Driven Dynamic Object Placement Optimization," the contents of which are hereby incorporated by reference in their entirety.

TECHNICAL FIELD

The present disclosure is related to applications and services running in a distributed computing environment using distributed hosts. Some aspects relate to objective driven dynamic object placement optimization for a plurality of objects of an application within the distributed computing environment.

BACKGROUND

Applications and services can include a plurality of distributed micro-services, which can be performed by different application objects associated with an application, while each object may be running from a separate distributed network node of a plurality of network nodes. Moving one application object may improve the performance of a specific component but may deteriorate the performance of the network system (i.e., the plurality of network nodes) that execute multiple application objects for the entire application.

For example, moving one application object from a mobile phone to an edge server may reduce the computing time for that object, but may increase the data transmission time between the moved application object and a neighboring application object. Therefore, finding a globally optimal placement for each application node of an application running within a network architecture can increase resource utilization efficiency.

SUMMARY

Various examples are now described to introduce a selection of concepts in a simplified form that are further described below in the detailed description. The Summary is not intended to identify key or essential features of the claimed subject matter, nor is it intended to be used to limit the scope of the claimed subject matter.

According to a first aspect of the present disclosure, there is provided a computer-implemented method for placement of a plurality of application objects of an application within a network architecture. The method can include generating during runtime of the application, an application topology model for the application, based on application metrics for the plurality of application objects. A resource topology model of a plurality of network nodes within the network architecture is generated based on resource metrics for the network nodes. A recommendation for migrating an application object of the plurality of application objects to a network node of the plurality of network nodes is determined using the application topology model and the resource topology model, the recommendation identifying the application object and the network node. The method further includes causing migration of the application object to the network node identified by the recommendation.

In a first implementation form of the method according to the first aspect as such, the application topology model includes an execution time matrix indicating execution times for each of the plurality of application objects when executed at a corresponding node of the plurality of network nodes, and a data size matrix indicating size of data transferred between at least two application objects of the plurality of application objects.

In a second implementation form of the method according to the first aspect as such or any preceding implementation form of the first aspect, the resource topology model includes a latency matrix indicating latency associated with a plurality of communication links, each communication link coupling two network nodes of the plurality of network nodes, and a transfer rate matrix indicating bandwidth information associated with the plurality of communication links.

In a third implementation form of the method according to the first aspect as such or any preceding implementation form of the first aspect, an objective function indicative of an optimization target for the placement of the plurality of application objects is retrieved.

In a fourth implementation form of the method according to the first aspect as such or any preceding implementation form of the first aspect, the optimization target is at least one of the following: application object time consumption associated with execution time of the plurality of application objects, and application object energy consumption associated with energy consumed when the plurality of application objects run at corresponding network nodes of the plurality of network nodes.

In a fifth implementation form of the method according to the first aspect as such or any preceding implementation form of the first aspect, the application object of the plurality of application objects is selected based on the execution time matrix.

In a sixth implementation form of the method according to the first aspect as such or any preceding implementation form of the first aspect, a plurality of time consumption values is determined for the selected application object, each of the time consumption values indicating time consumption when the selected application object is executed at a corresponding node of the plurality of network nodes.

In a seventh implementation form of the method according to the first aspect as such or any preceding implementation form of the first aspect, the network node of the plurality of network nodes is selected for the migration based on a minimum time consumption value of the plurality of time consumption values. The recommendation for migrating the application object from running on a current node to the selected network node is generated.

In an eighth implementation form of the method according to the first aspect as such or any preceding implementation form of the first aspect, a network configuration change associated with one or more of the network nodes within the network architecture is detected.

In a ninth implementation form of the method according to the first aspect as such or any preceding implementation form of the first aspect, an updated application topology model for the application and an updated resource topology model of the plurality of network nodes are generated based on the detected network configuration change. An updated recommendation for migrating the application object based on the updated application topology model and the updated resource topology model is provided.

In a tenth implementation form of the method according to the first aspect as such or any preceding implementation form of the first aspect, the network configuration change includes at least one of the following: a network availability change and power consumption configuration change for at least one of the plurality of network nodes within the network architecture.

According to a second aspect of the present disclosure, there is provided a system including a memory that stores instructions and one or more processors in communication with the memory. The one or more processors execute the instructions to generate an application topology model for an application, based on application metrics for a plurality of application objects associated with the application. A resource topology model of a plurality of network nodes within a network architecture is generated based on resource metrics for the network nodes. A recommendation is determined for migrating an application object of the plurality of application objects to a network node of the plurality of network nodes using the application topology model and the resource topology model. The recommendation identifies the application object and the network node. The one or more processors execute the instructions to further cause migration of the application object to the network node identified by the recommendation.

In a first implementation form of the system according to the second aspect as such, the application topology model includes an execution time matrix indicating execution times for each of the plurality of application objects when executed at a corresponding node of the plurality of network nodes, and a data size matrix indicating size of data transferred between at least two application objects of the plurality of application objects.

In a second implementation form of the system according to the second aspect as such or any preceding implementation form of the second aspect, the resource topology model includes a latency matrix indicating latency associated with a plurality of communication links, each communication link coupling two network nodes of the plurality of network nodes. The resource topology model also includes a transfer rate matrix indicating bandwidth information associated with the plurality of communication links.

In a third implementation form of the system according to the second aspect as such or any preceding implementation form of the second aspect, an objective function indicative of an optimization target for placement of the plurality of application objects is retrieved.

In a fourth implementation form of the system according to the second aspect as such or any preceding implementation form of the second aspect, the optimization target is at least one of the following: application object time consumption associated with execution time of the plurality of application objects, and application object energy consumption associated with energy consumed when the plurality of application objects run at corresponding network nodes of the plurality of network nodes.

In a fifth implementation form of the system according to the second aspect as such or any preceding implementation form of the second aspect, the application object of the plurality of application objects is selected for the migration based on the execution time matrix.

In a sixth implementation form of the system according to the second aspect as such or any preceding implementation form of the second aspect, a plurality of time consumption values is determined for the selected application object, each of the time consumption values indicating time consumption when the selected application object is executed at a corresponding node of the plurality of network nodes.

In a seventh implementation form of the system according to the second aspect as such or any preceding implementation form of the second aspect, the network node of the plurality of network nodes is selected for the migration based on a minimum time consumption value of the plurality of time consumption values. The recommendation for migrating the application object from running on a current node to the selected network node is generated.

According to a third aspect of the present disclosure, there is provided a non-transitory computer-readable medium storing instruction for placement of a plurality of application objects of an application within a network architecture, that when executed by one or more processors, cause the one or more processors to perform operations. The operations include generating during runtime of the application, an application topology model for the application, based on application metrics for the plurality of application objects. A resource topology model of a plurality of network nodes within the network architecture is generated based on resource metrics for the network nodes. A recommendation is determined for migrating an application object of the plurality of application objects to a network node of the plurality of network nodes using the application topology model and the resource topology model. The recommendation identifies the application object and the network node. The operations further include causing migration of the application object to the network node identified by the recommendation.

Any one of the foregoing examples may be combined with any one or more of the other foregoing examples to create a new embodiment within the scope of the present disclosure.

BRIEF DESCRIPTION OF THE DRAWINGS

In the drawings, which are not necessarily drawn to scale, like numerals may describe similar components in different views. The drawings illustrate generally, by way of example, but not by way of limitation, various embodiments discussed in the present document.

DETAILED DESCRIPTION

Figure 1:
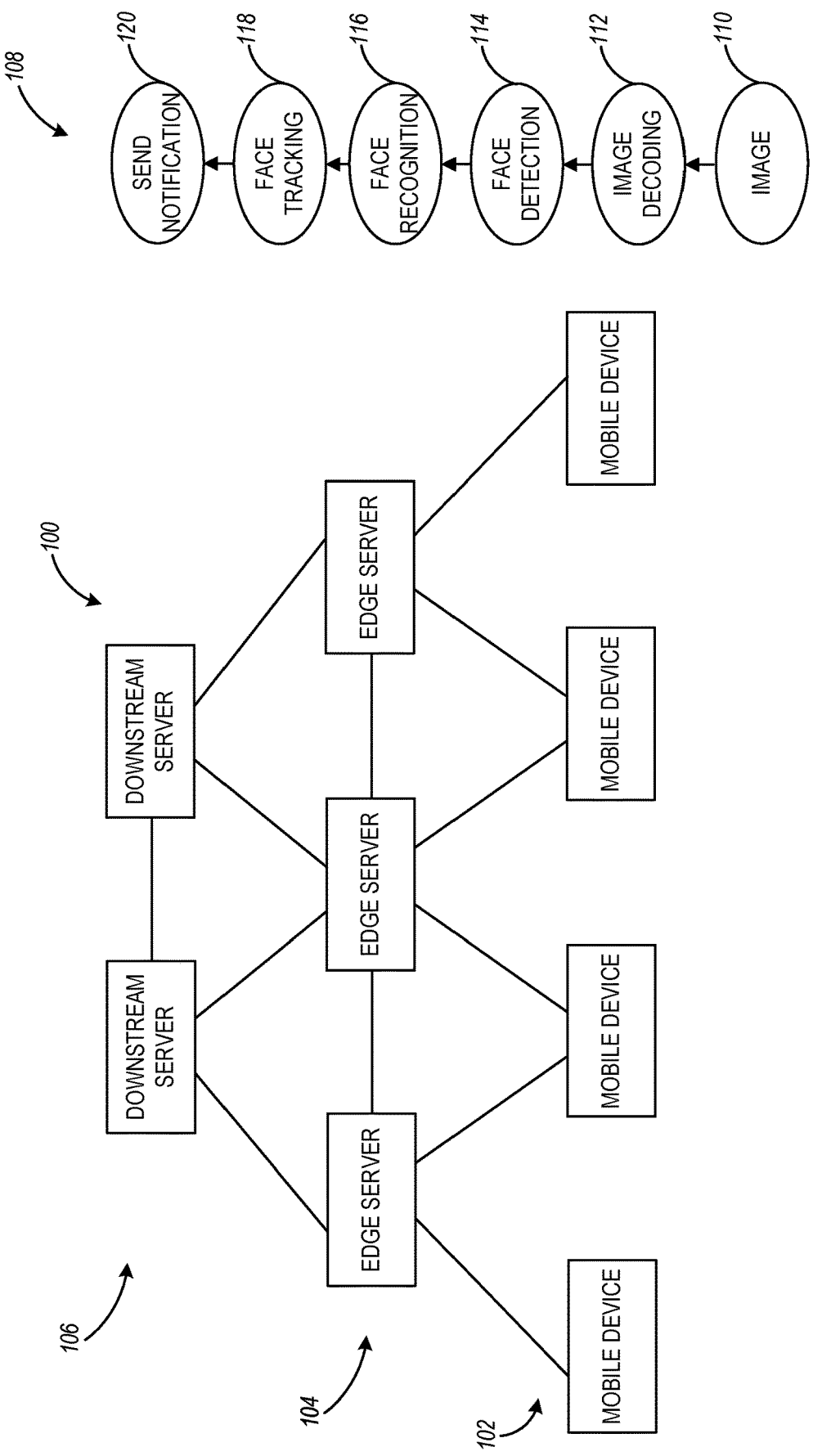
FIG. 1 is a block diagram of application objects associated with an application running in a distributed network environment, according to some example embodiments.

It should be understood at the outset that although an illustrative implementation of one or more embodiments are provided below, the disclosed systems and/or methods described with respect to FIGS. 1-13 may be implemented using any number of techniques, whether currently known or not yet in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In the following description, reference is made to the accompanying drawings that form a part hereof, and in which are shown, by way of illustration, specific embodiments which may be practiced. These embodiments are described in sufficient detail to enable those skilled in the art to practice the inventive subject matter, and it is to be understood that other embodiments may be utilized, and that structural, logical, and electrical changes may be made without departing from the scope of the present disclosure. The following description of example embodiments is, therefore, not to be taken in a limiting sense, and the scope of the present disclosure is defined by the appended claims.

Conventional application schedulers only perform scheduling upon application submission, without any runtime placement optimization (i.e., there is no migration of application objects of an application during runtime in order to improve efficiency and network performance). Additionally, conventional application schedulers only ensure that a single host (e.g., the host where the application will be deployed) has enough resources to run the application. Furthermore, conventional application schedulers do not accept user specified objective functions in order to perform runtime application object migration. As used herein, the term "runtime" indicates a time period that a software program is running (e.g., a time period during which one or more application objects associated with the program are being executed or running) The term "runtime" includes time after the program is executed but it remains in a sleep (or inactive or low-power) mode.

Techniques disclosed herein can be used to dynamically adjust application object placement at runtime, to maximize an objective function specified by a user (e.g., time consumption optimization, energy consumption optimization, compute resource cost optimization, and so forth). Techniques disclosed herein for application object scheduling and migration use (1) a model generator which builds a model (e.g., a resource topology model and an application topology model) for a target application that will be deployed; (2) a plan generator which generates various object placement plans for migrating one or more application objects of the target application; and (3) a location optimizer which selects an object migration plan and communicates (or executes) an application object migration instruction associated with the object migration plan.

The model generator uses application and network resource metrics data to generate output models—one model captures the network resource topology, and a second model captures the application topology showing application object interconnections and data request size for links between objects. The plan generator uses the model output of the model generator to determine time consumption information (or other metric associated with the objective user-defined function) for each of the application objects, when an individual object runs on each of the network nodes. An optimal node is then selected for one or more of the application objects, and a migration recommendation can be generated for the one or more application objects based on the time consumption information.

In difference to existing application scheduling solutions where only a single host is selected prior to execution of the application, runtime optimization of one or more individual application objects (and migration of such objects to different network nodes) can be achieved during runtime using the techniques disclosed herein.

FIG. 1 is a block diagram of application objects associated with an application running in a distributed network environment 100, according to some example embodiments. Referring to FIG. 1, there is illustrated an application 108 which can be configured to run on one or more nodes within the distributed network environment 100. The distributed network environment 100 can include, for example, a plurality of mobile devices 102, a plurality of edge servers 104, and a plurality of downstream servers 106. In some aspects, different application modules associated with the application 108 can be deployed at one or more different network nodes within the network environment 100.

Application 108 can be an image processing application which can include the following application objects: an image object 110 for obtaining an image, an image decoding object 112 for decoding the image, a face detection object 114 for detecting faces within the decoded image, a face recognition object 116 for recognizing a detected face, a face tracking object 118 for tracking a recognized face, and a notification communication object 120 for generating one or more notifications in connection with the face tracking. One or more of the objects 110-120 of application 108 can be deployed within the distributed network environment 100 in connection with techniques disclosed herein.

Site reliability engineers (SREs) may not be aware where to deploy the application objects 110-120 in order to obtain optimal performance when executing application 108. Application objects can run on top of large amount of unreliable distributed hardware. Since the hardware environment can dynamically change (e.g. a node or a network link may go down or up), the workload pattern may change, and consequently, the optimal application object placement can change. Therefore, static placement decisions for application objects made by a SRE may not be optimal. Techniques disclosed herein can be used for an optimal placement of application objects within a distributed network architecture based on an objective function (e.g., determine object placement based on optimizing application performance, optimizing energy consumption, optimizing a combination of application performance and energy consumption, or another objective function).

Figure 2:
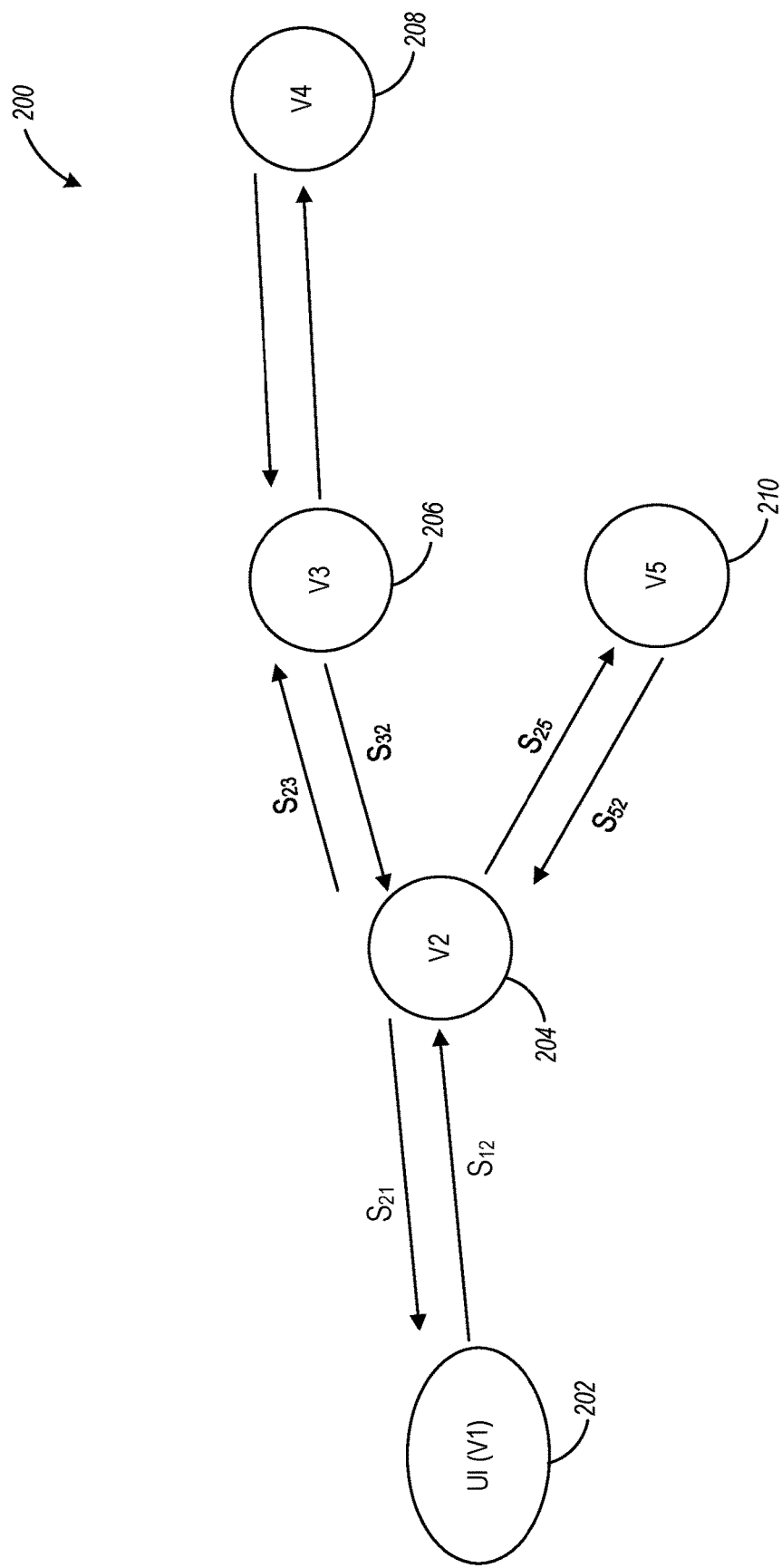
FIG. 2 is a block diagram of an application topology model including a plurality of objects associated with an application, according to some example embodiments.

FIG. 2 is a block diagram of an application topology model 200 including a plurality of objects associated with an application, according to some example embodiments. Referring to FIG. 2, the application topology model 200 can include application objects 202, 204, 206, 208, and 210, which are illustrated as graph vertices V1, V2, V3, V4, and V5, respectively. In some aspects, the application topology model 200 can be further characterized and annotated with additional information associated with the application nodes, such as a size of data transferred between objects. For example, the size of data transferred between objects V1 and V2 is indicated as $S_{12}$. Additional annotations of the size of data transfer between the remaining application objects is illustrated in FIG. 2.

In some aspects, the following information can be collected for each application object at runtime: execution time of the application object on a device ($t^{device}$), execution time of the application object on a server ($t^{server}$), total size of input and output data to transfer state between current vertex and other vertices connected to it ($S^{total}$) (e.g., for the application object associated with vertex V2 it will be $S^{total}=S_{12}+S_{21}+S_{23}+S_{32}+S_{25}+S_{52}$), energy consumption if the application object is executed on a device ($E^{device}$) and energy consumption if the application object is executed remotely (i.e., not on the device) ($E^{remote}$).

In some aspects, moving one or more of the application objects 202-210 to different network nodes may improve the performance of the specific application object, but may reduce the overall system performance of the application. For example, moving application object 204 from a mobile device to an edge server may reduce the computing time, but may increase the data transmission time (e.g., between V2 and V1). Techniques disclosed herein can be used to determine, at runtime, whether system performance can be improved based on an object function and generate an object placement recommendation for relocating one or more application objects two different network nodes.

Conventional application management techniques (e.g., where services and applications are managed by SREs) include a selection of a single host/node from a plurality of available network nodes (e.g., based on computing power and available resources at the nodes) to run the entire application (i.e., all application objects are executed on a single node). In this regard, conventional application management techniques do not utilize runtime placement optimization for application objects and do not use objective functions for purposes of assessing current placement of the application nodes and generating a recommendation for object relocation and placement. In comparison, techniques disclosed herein can be used to dynamically adjust application object placement for an application at runtime, in order to maximize an objective function specified by user. In this regard, application object placement can be dynamically adjusted, and application objects can be migrated so that an application can be self-tuning, improving availability, performance, energy efficiency, and so forth.

As used herein, the term "node" includes a network device or server, with each node having a processor with a predefined CPU speed or available/unused CPU capacity. The term "link" indicates a communication path between two nodes. A link can be wired or wireless, and round-trip time (RTT) as well as transfer speed can be measured for each link.

Figure 3A:
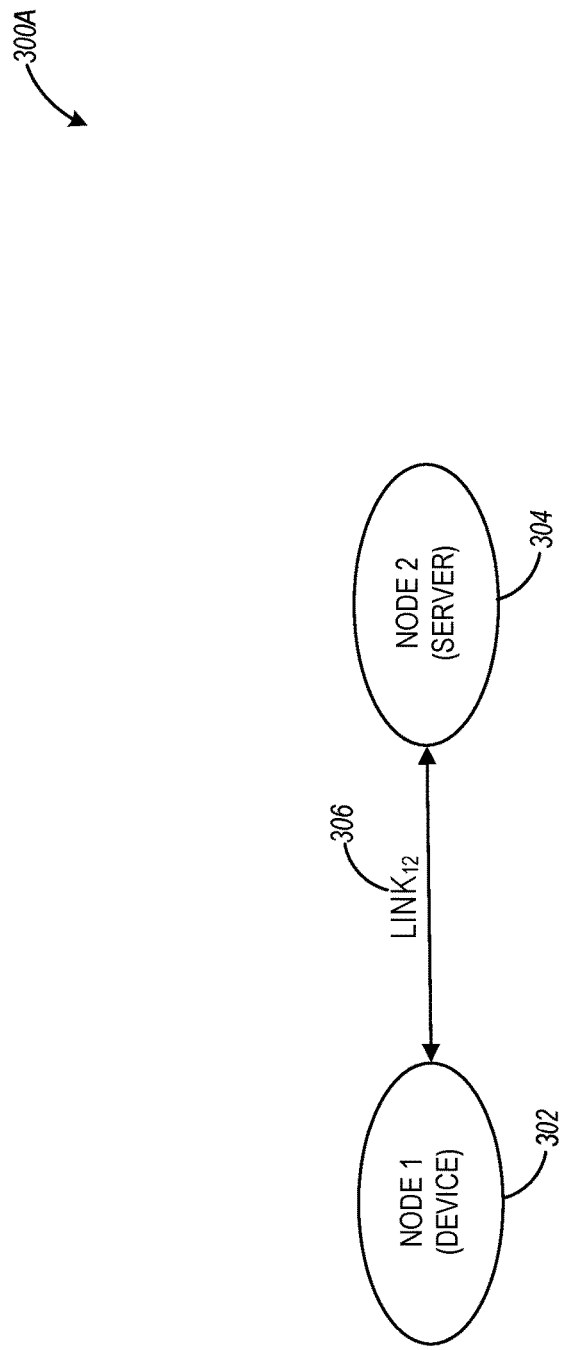
FIG. 3A, FIG. 3B, FIG. 3C, and FIG. 3D illustrate example network topology models for a plurality of network nodes, according to some example embodiments.
Figure 3B:
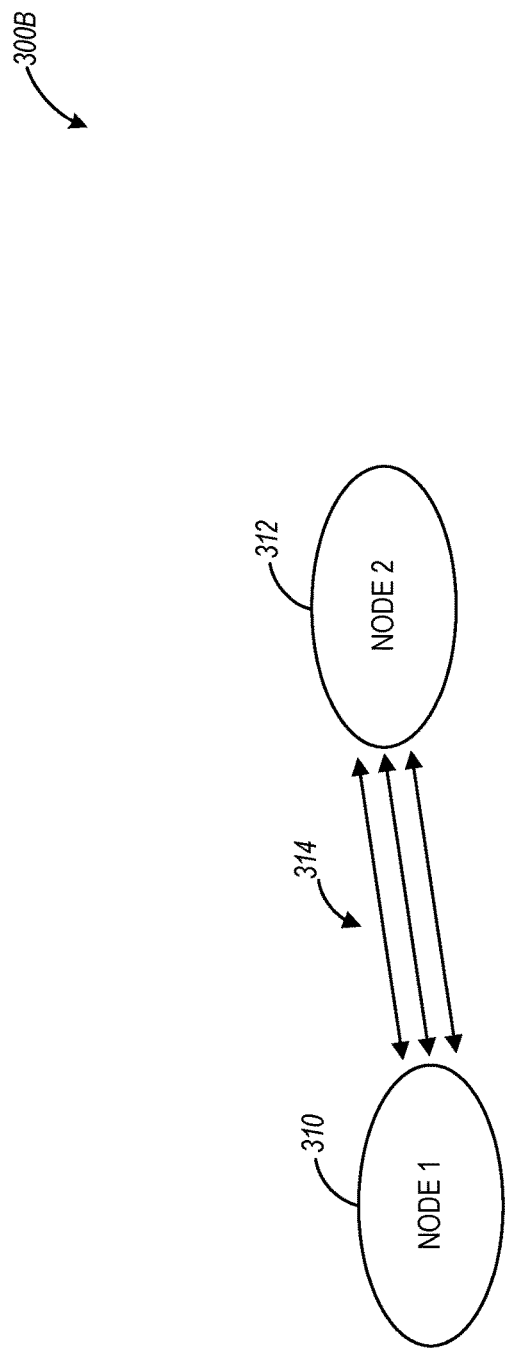
Figure 3C:
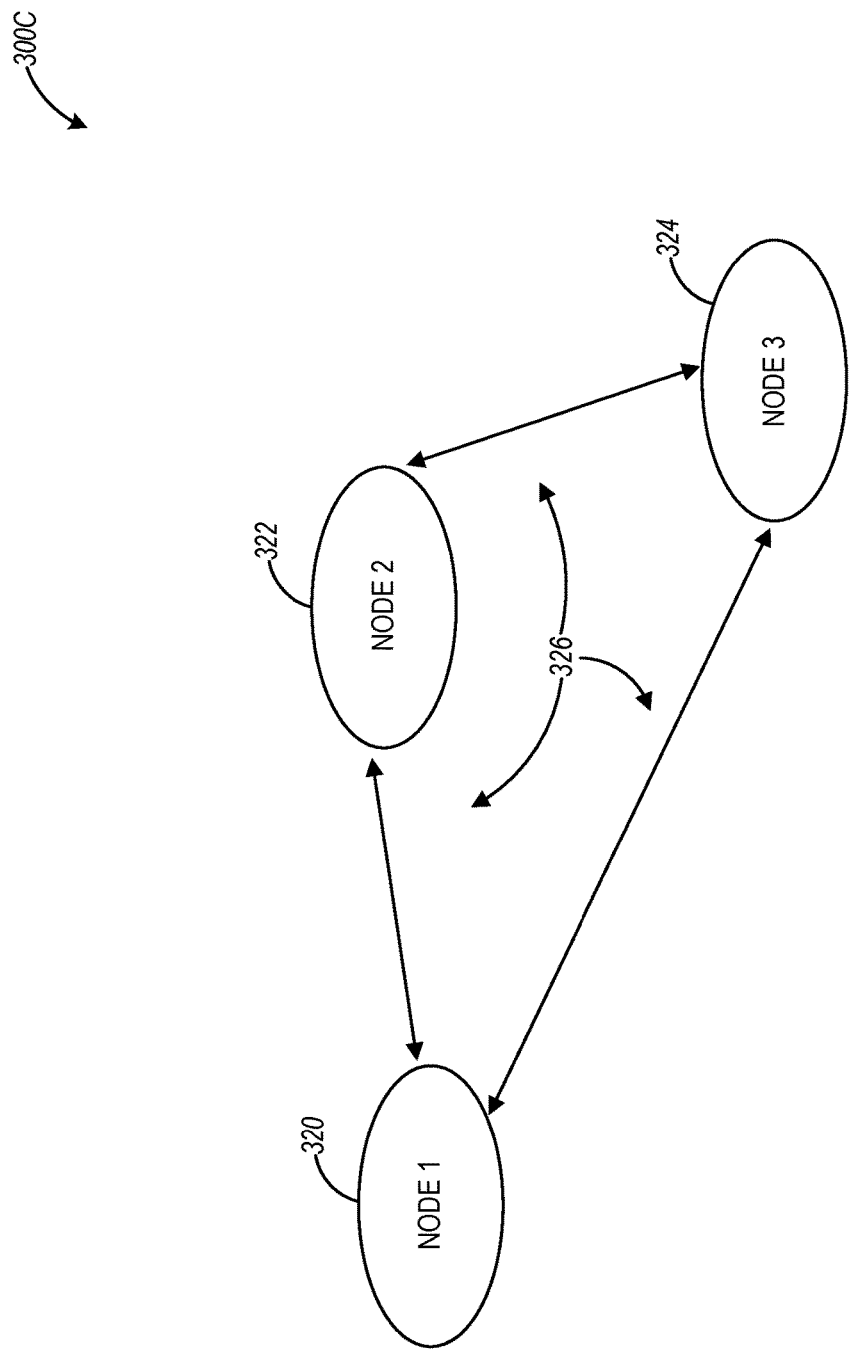
Figure 3D:
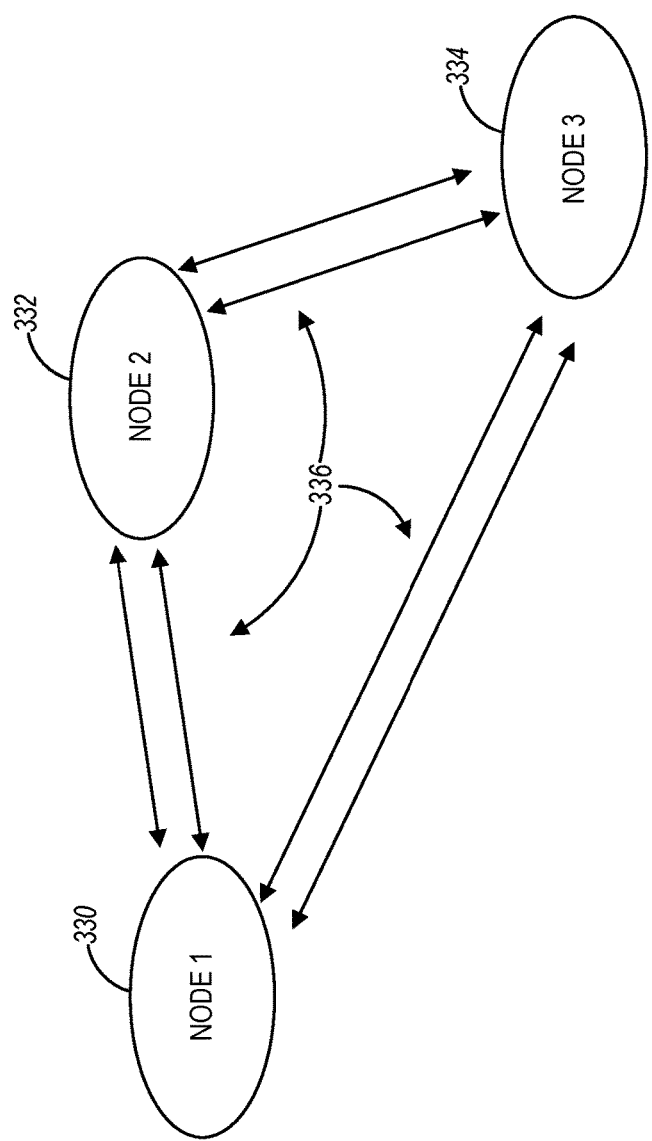

FIG. 3A, FIG. 3B, FIG. 3C, and FIG. 3D illustrate example network topology models for a plurality of network nodes, according to some example embodiments. FIG. 3A illustrates a network topology model 300A, which includes nodes 302 and 304 connected by a single link 306. FIG. 3B illustrates a network topology model 300B, which includes nodes 310 and 312 connected by multiple links 314. FIG. 3C illustrates a network topology model 300C, which includes nodes 320, 322, and 324 coupled via single links 326. FIG. 3D illustrates a network topology model 300D, which includes nodes 330, 332, and 334 coupled via multiple links 336. In some aspects, an object placement recommendation generated using techniques disclosed herein can indicate an application object for relocation, a node that the object is to be relocated to, and a communication link to use for such relocation (e.g., in aspects where nodes are connected via multiple links).

Figure 4:
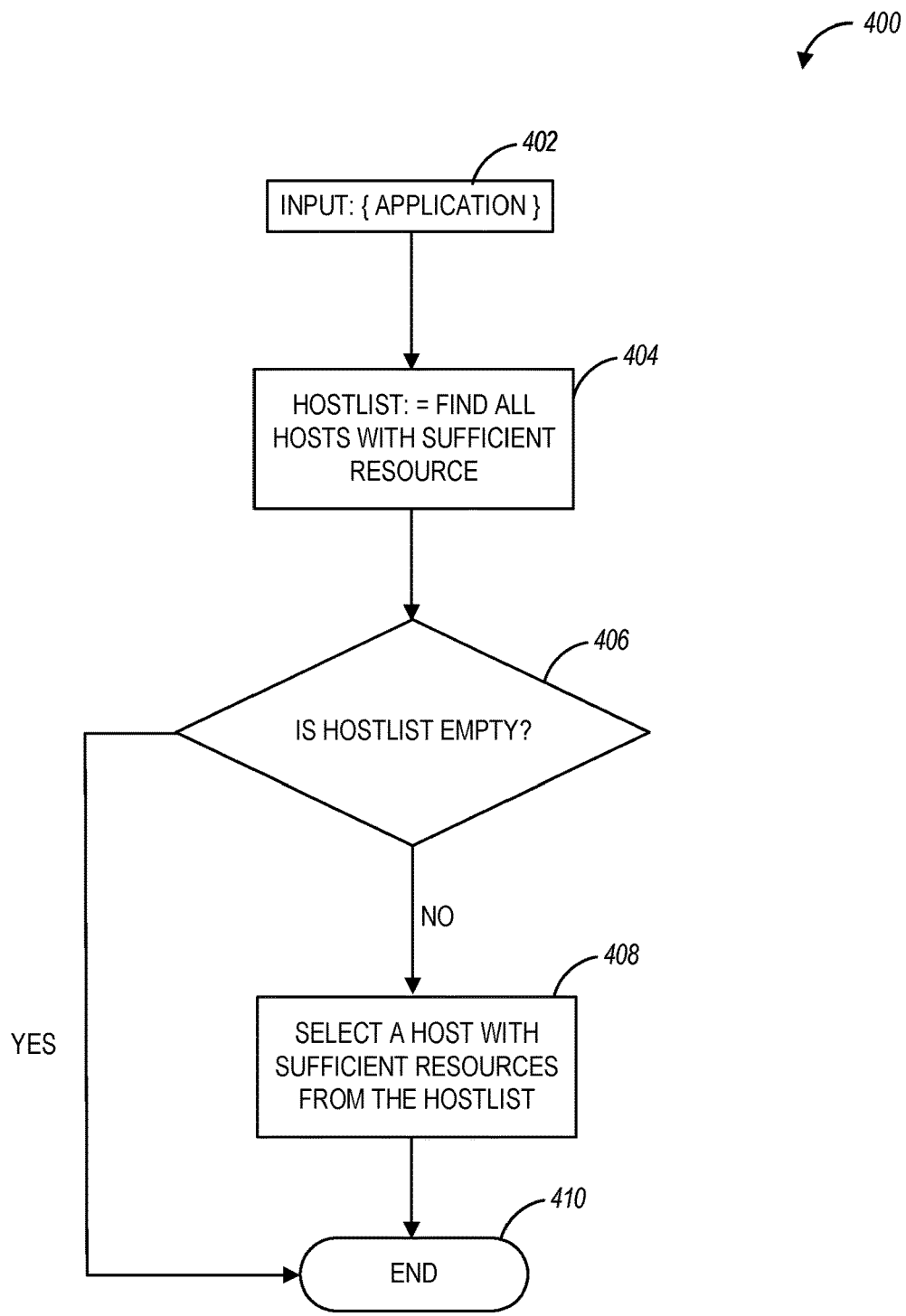
FIG. 4 is a flow diagram illustrating selection of a network host from a plurality of hosts for running an application, according to some example embodiments.

FIG. 4 is a flow diagram illustrating selection of a network host from a plurality of hosts for running an application, according to some example embodiments. Referring to FIG. 4, the method 400 can be performed by an application scheduler (e.g., 604 in FIG. 6) and can start at operation 402 when a new application is received for deployment. At operation 404, one or more hosts (e.g., network nodes) with sufficient resources to run the application are located and a host list with the located hosts is generated. At operation 406, it can be determined whether the host list generated at operation 404 is empty. If the host list is empty, the method 400 concludes at operation 410. If the host list is not empty, at operation 408, a host with sufficient resources can be selected from the host list in order to run the application. In some aspects, the application scheduler (e.g., 604 in FIG. 6) can place application objects associated with the application on individual hosts based on object placement recommendations generated using techniques disclosed herein.

Figure 5:
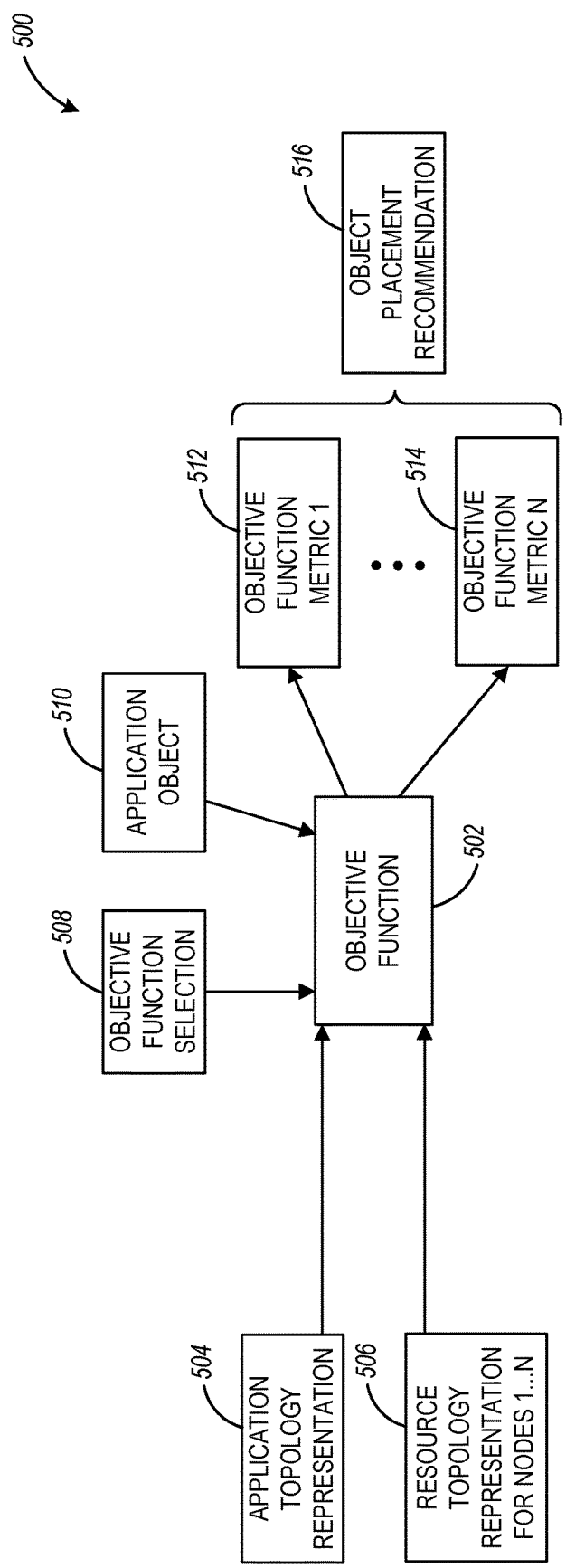
FIG. 5 is a high-level block diagram illustrating generation of an object placement recommendation based on an objective function selection, according to some example embodiments.

FIG. 5 is a high-level block diagram illustrating a system 500 for generation of an object placement recommendation based on an objective function selection, according to some example embodiments. Referring to FIG. 5, the system 500 can include a module 504 for generating an application topology representation associated with an application that includes a plurality of application objects for an application (e.g., 108), and a module 506 for generating a resource topology representation for a plurality of N network nodes (e.g., nodes 1, N). The system 500 can be configured to use an objective function 502 (e.g., as selected at operation 508) to determine an object placement recommendation 516 for an application object 510, as further described herein below. More specifically, the objective function 502 can include at least one equation using data associated with the application topology representation and the resource topology representation generated by modules 504 and 506.

At operation 510, one of a plurality of objects associated with the application can be selected. In some aspects, the objects associated with the application can be ranked based on time consumption and/or energy consumption (or based on other characteristics that can be predefined or available at runtime). The objective function 502 can be used for generating objective function metrics 512, . . . , 514. For example, N objective function metrics can be generated assuming the selected application object 510 is running on each of the N nodes. An object placement recommendation 516 can be generated based on the objective function metrics 512, . . . , 514. In some aspect, the objective function selection and the application object selection can be performed by the model generator module 608 or other modules of the system 600 of FIG. 6.

Figure 6:
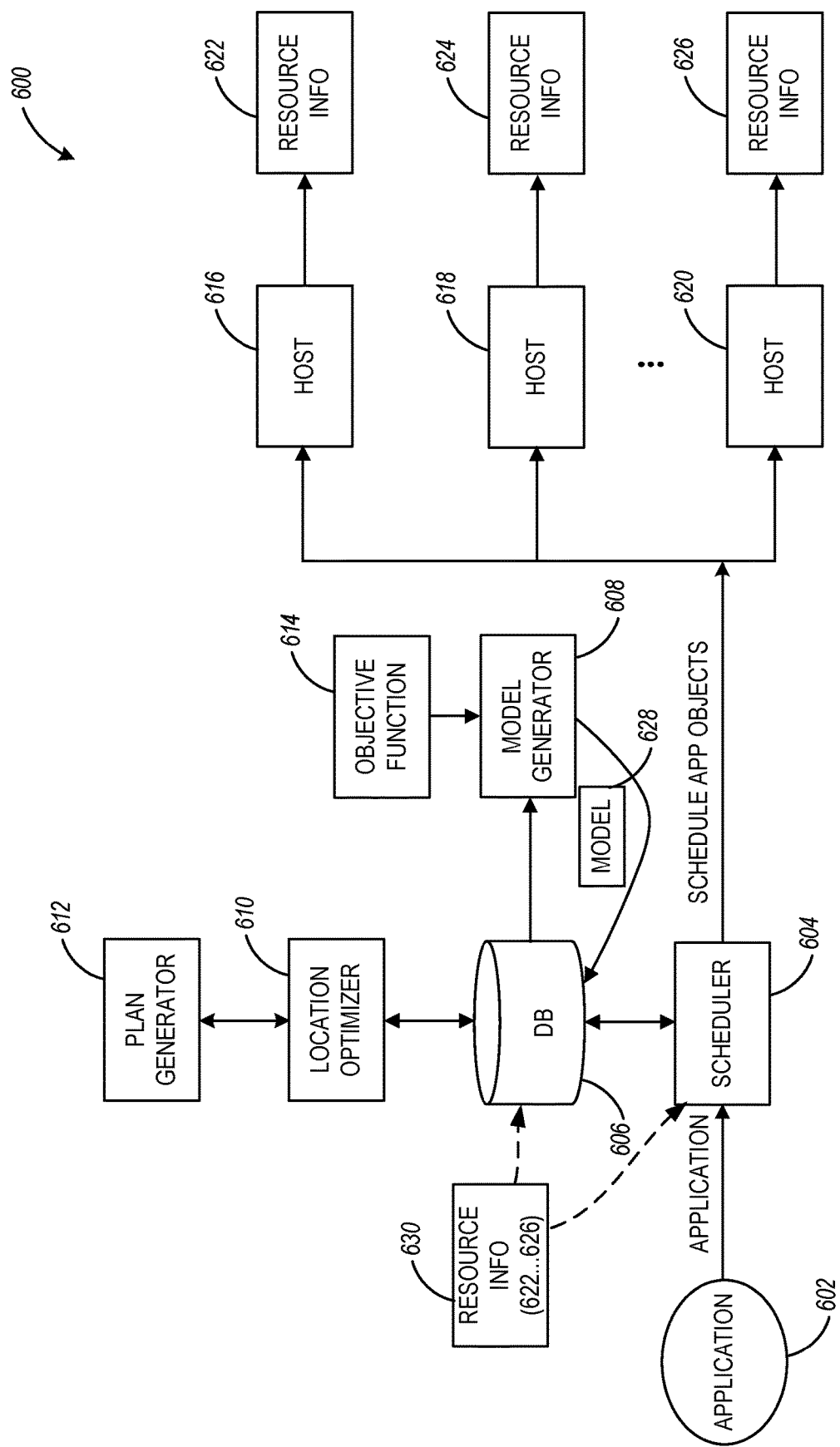
FIG. 6 is a block diagram illustrating a system for generating object placement recommendations, according to some example embodiments.

FIG. 6 is a block diagram illustrating a system 600 for generating object placement recommendations, according to some example embodiments. Referring to FIG. 6, the system 600 can include a scheduler 604, a database 606, a model generator module 608, a location optimizer module 610, a plan generator module 612, and a plurality of hosts (or network nodes) 616, 618, . . . , 620.

The model generator module 608 may comprise suitable circuitry, logic, interfaces, and/or code and can be configured to use application and network resource metrics data to generate an output model 628 (e.g., a network resource topology model and an application topology model indicative of application object interconnections and data request size for links between the objects).

The plan generator module 612 may comprise suitable circuitry, logic, interfaces, and/or code and can be configured to use the output model (e.g., 628) of the model generator module 608 to determine time consumption information (or other metric associated with the objective user-defined function) for each of the application objects, when an individual object runs on each of the network nodes. An optimal node can be selected for one or more of the application objects, and a migration recommendation can be generated for the one or more application objects based on the time consumption information. In this regard, the plan generator module 612 is configured to generate various object placement plans based on the output model (e.g., 628) generated by the model generator module 608.

The location optimizer module 610 may comprise suitable circuitry, logic, interfaces, and/or code and can be configured to select one of the object placement plants generated by the plan generator module 612, which can be communicated to the scheduler 604 for execution and runtime placement optimization of the application module.

Each of the network nodes 616, 618, . . . , 620 can output corresponding resource information 622, 624, . . . , 626 (collectively indicated as 630 in FIG. 6), which can be communicated to the scheduler 604 for storing in the database 606. The resource information 622, 624, . . . , 626 can include available resources at the corresponding node, the node CPU characteristics, number and type of network links available to the node, link bandwidth, and so forth. After the resource information is stored in the database 606, it can be available to any of the modules 608, 610, and 612 for purposes of generating the object placement recommendations.

In operation, an application 602 can be submitted to the scheduler 604 for execution on one or more of the nodes 616, . . . , 620. Additionally, an objective function 614 can be received by the model generator module 608. Initially, application objects associated with the application 602 can be executed from a single host, while the model generator module 608, the plan generator module 612, and the location optimizer module 610 can generate one or more application object placement recommendations during application runtime. As application object recommendations are generated, the scheduler 604 can migrate such application objects to different nodes selected from nodes 616, . . . , 620 based on the recommendations, thereby dynamically updating application object placement during runtime.

Figure 7:
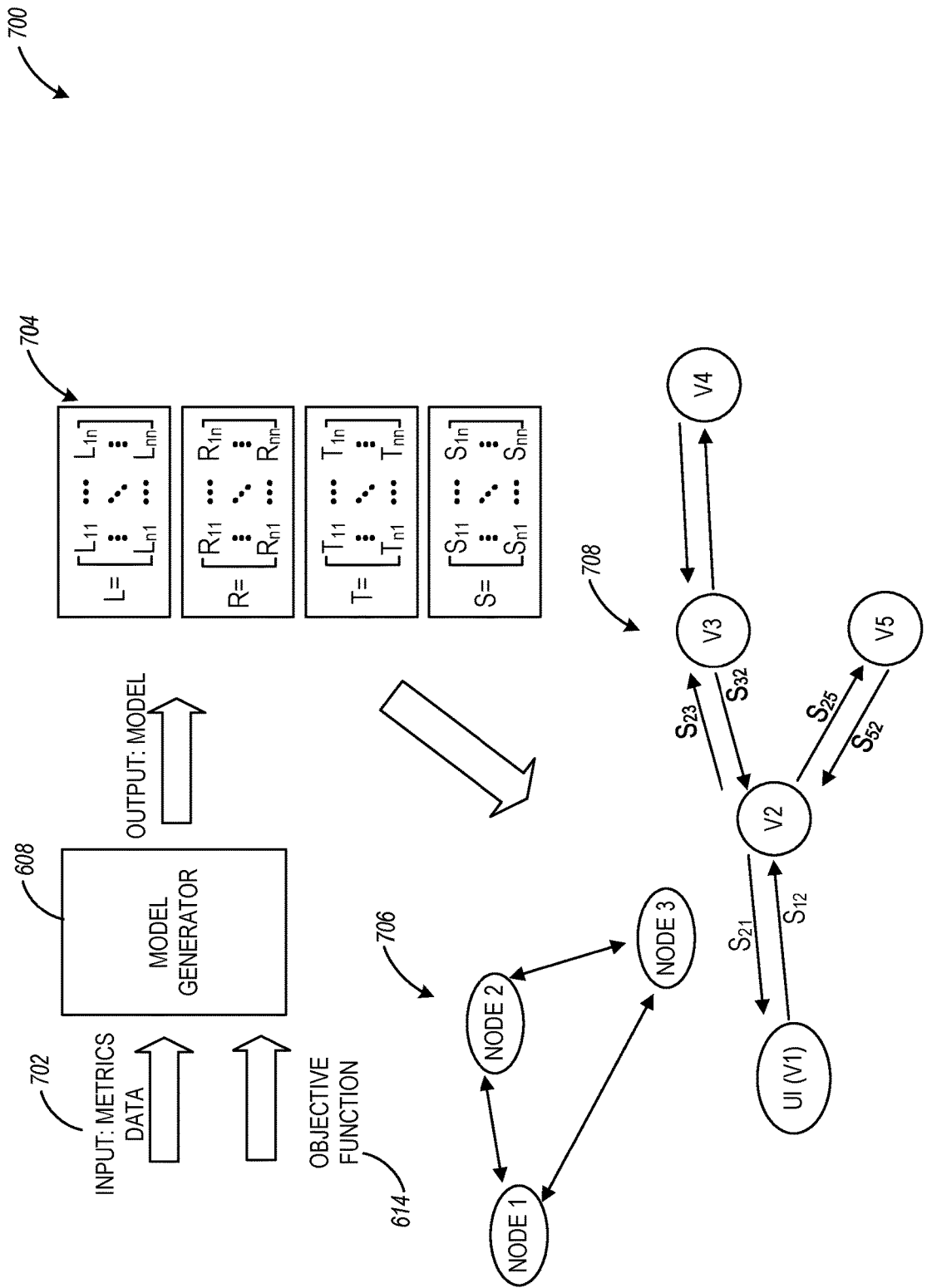
FIG. 7 illustrates a block diagram of a model generator that can be used in connection with the system of FIG. 6, according to some example embodiments.

FIG. 7 illustrates a block diagram of a model generator that can be used in connection with the system of FIG. 6, according to some example embodiments. Referring to FIG. 7, diagram 700 provides a more detailed view of the operation of the model generator module 608. More specifically, the model generator module 608 can receive as input metrics data 702 and the objective function 614. For example, the input metrics data 702 can include the resource information 622, 624, . . . , 626 as well as application object-related information such as object identifications of objects for the received application 602, connections between individual application objects, data size communicated between the objects, and so forth.

In some aspects, the input metrics data 702 can include vertex status information associated with each application object of the application, including the following status information: IsOffloaded flag (this flag can be 0 if the application object is running locally, or 1 if the application object is running remotely); average energy consumption ($E^{device}$ if the object is running locally on a mobile device, $E^{remote}$ if the object is running remotely on a remote server), average time consumption ($t^{device}$ if the object is running locally on a mobile device, $t^{remote}$ if the object is running remotely, which can be based on average time consumption $t^{server}$ if the object is running on a remote server). Time of remote execution can be estimated as $t^{remote} = t^{server} + S^{total}/R + L$, where R is the transfer rate between nodes, L is the latency between nodes, and S is the data size of a data transfer between nodes. In some aspects, the ratio $t^{server}/t^{device} = cpu^{server}/cpu^{device}$ can be used to estimate $t^{server}$ if the application object is executed on a local device only (and not a server) and vice versa. In some aspects, the average time consumption associated with an application object running on a network node can be determined using equation (1) provided herein below.

The model generator module 608 can generate an output 704, which can include a plurality of matrixes (e.g., L, R, T, and S matrices) as described below. The output 704 can be used to generate a resource topology model 706 associated with the available network nodes (e.g., 616, . . . , 620) and an application topology model 708 associated with the application objects of application 602. In some aspects, the resource topology model 706 and the application topology model 708 can be represented by graph models including a plurality of vertices, as illustrated in FIG. 7.

In some aspects, the following matrices can represent output 704 of the model generator module 608, for a given set of n nodes (e.g., N1, . . . , Nn) and a set of m vertices of the application topology module 708 (i.e., m number of application objects for application 602):

Output matrices including data for network nodes:
Matrix $$L = \begin{bmatrix} L_{11} & \cdots & L_{1n} \\ \vdots & \ddots & \vdots \\ L_{n1} & \cdots & L_{nn} \end{bmatrix},$$

where $L_{ij}$ is latency between nodes $N_i$ and $N_j$ (sliding window average and symmetric);

Matrix $$R = \begin{bmatrix} R_{11} & \cdots & R_{1n} \\ \vdots & \ddots & \vdots \\ R_{n1} & \cdots & R_{nn} \end{bmatrix},$$

where $R_{ij}$ is transfer rate between nodes $N_i$ and $N_j$ (sliding window average and symmetric); and Vector cpu=(cpu$_1$, ..., cpu$_n$), where cpu is the CPU speed of node $N_i$.

Output matrices including data for application objects (e.g., vertices in graph 708):

Matrix $$T = \begin{bmatrix} T_{11} & \cdots & T_{1n} \\ \vdots & \ddots & \vdots \\ T_{m1} & \cdots & T_{mn} \end{bmatrix},$$

where $T_{ij}$ is execution time for vertex $V_i$ when running on node $N_j$ (sliding window average). If execution time for vertex $V_k$ on one node is known, execution time on all of nodes can be determined from the ratio $T_{ki}:T_{kj}$=cpu$_i$:cpu$_j$.

Matrix $$S = \begin{bmatrix} S_{11} & \cdots & S_{1m} \\ \vdots & \ddots & \vdots \\ S_{m1} & \cdots & S_{mm} \end{bmatrix},$$

where $S_{ij}$ is the size of data for status transfer from vertex $V_i$ to vertex $V_j$ (sliding window average; non-symmetric).

Vector pos=(pos$_1$, ..., pos$_m$), where pos$_i$ is the ID of the node where vertex $V_i$ is running. In some aspects, all vertices of the application topology model (i.e., all objects) start on node $N_1$, i.e. pos$_i$=1 for all i.

Vector $t^{cur}$=($t_1^{cur}$, ..., $t_m^{cur}$) where $t_i^{cur}$ is current time consumption by vertex $V_i$. In some aspects, all vertices start with $t_i^{cur}$=$T_{i1}$.

In this regard, the L and R matrices are associated with the resource topology model 706, and the T and S matrices are associated with the application topology model 708.

Figure 8A:
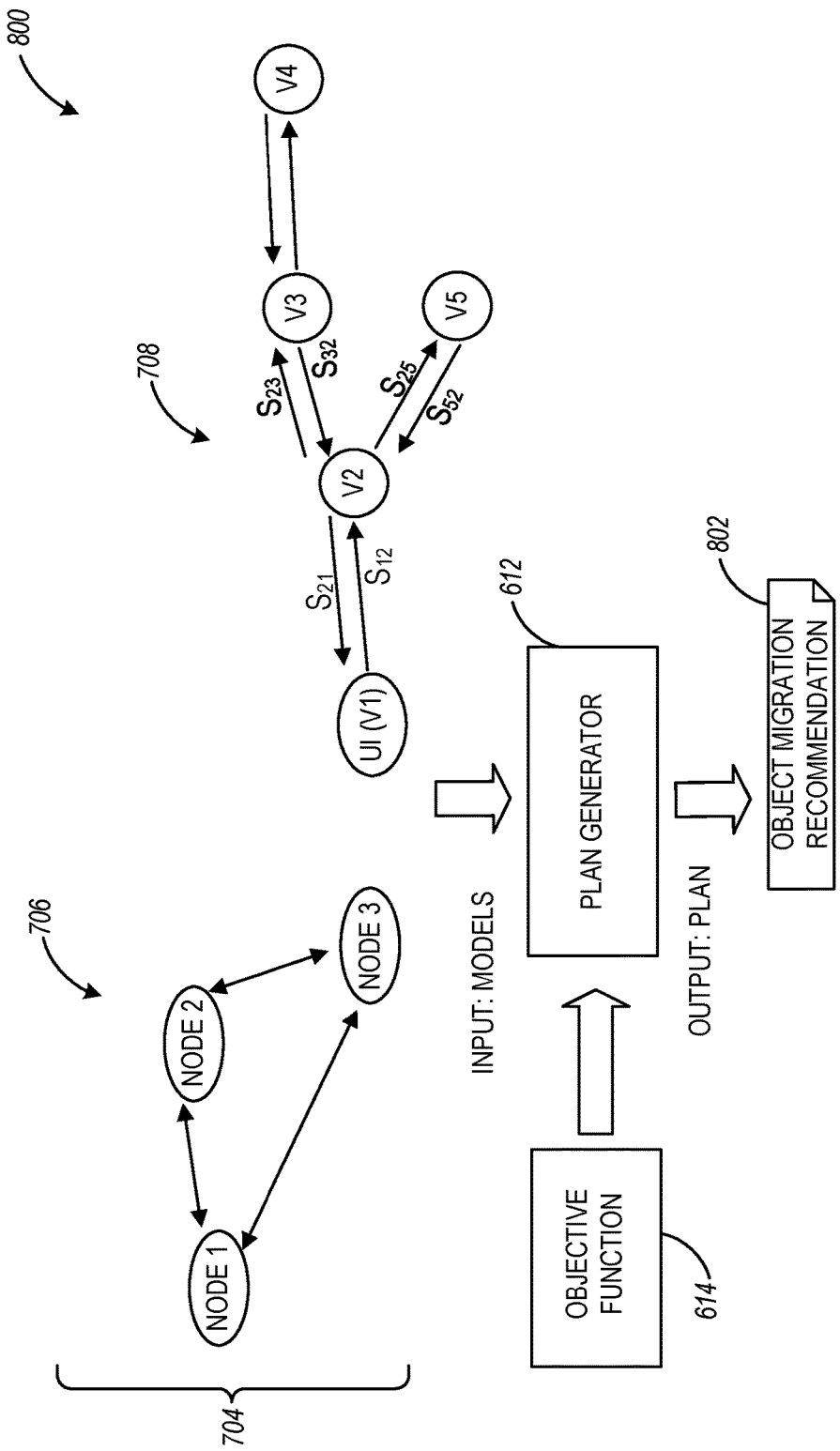
FIG. 8A illustrates a block diagram of a plan generator that can be used in connection with the system of FIG. 6, according to some example embodiments.

FIG. 8A illustrates a block diagram 800 of a plan generator that can be used in connection with the system of FIG. 6, according to some example embodiments. Referring to FIG. 8A, the application topology model 708 and the resource topology model 706 (represented by the matrices L, R, T, and S of output 704 from the model generator module 608) can be communicated to the plan generator module 612 as input. Additionally, the plan generator module 612 can also receive as input the objective function 614.

Figure 8B:
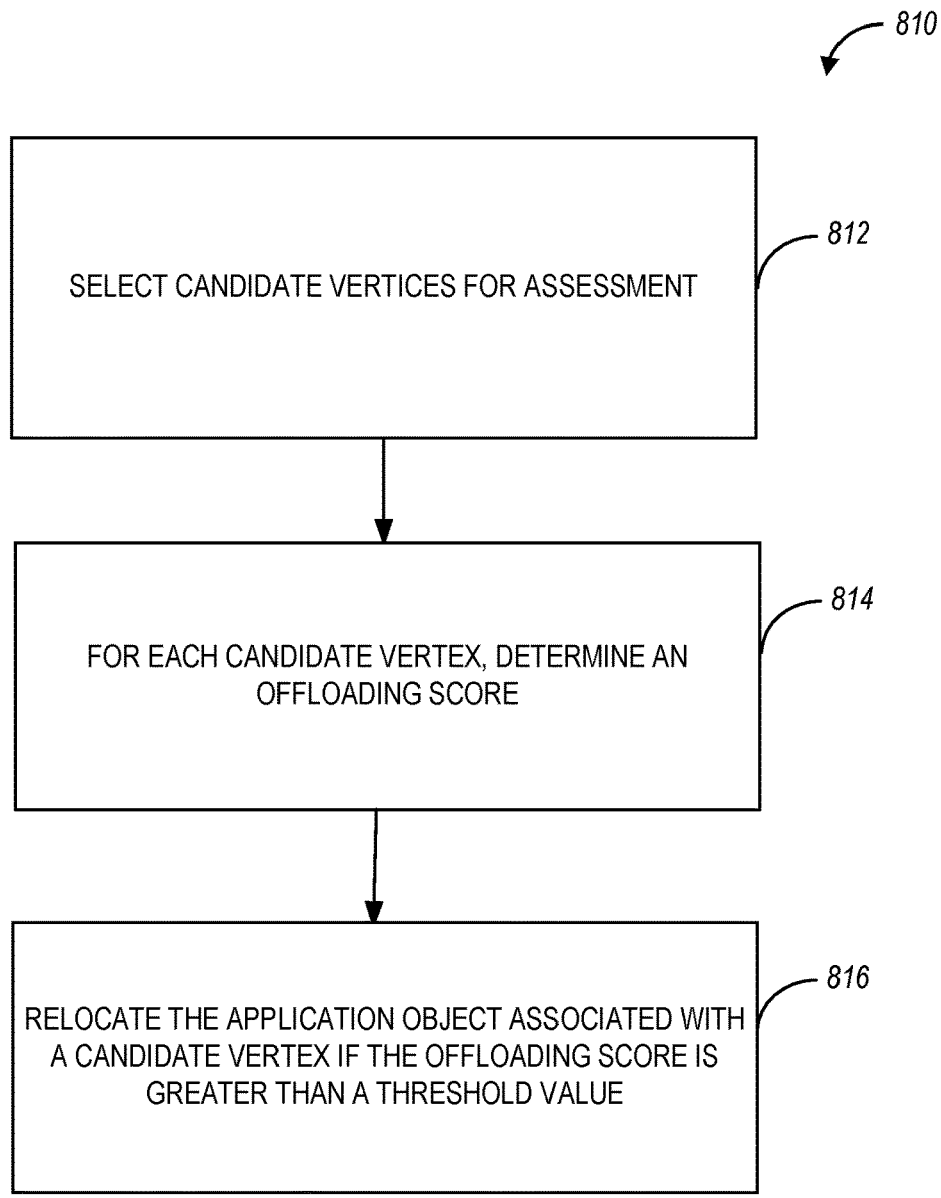
FIG. 8B is a flowchart of a method that can be performed by a plan generator in connection with generating an object migration recommendation of whether to relocate an application object, according to some example embodiments.

FIG. 8B is a flowchart of a method 810 that can be performed by the plan generator module 612 in connection with generating the object migration recommendation 802 of whether to relocate an application object, according to some example embodiments. The method 810 includes operations 812, 814, and 816, which can be performed by the plan generator module 612 periodically, at pre-determined time intervals.

At operation 812, candidate vertices (e.g., vertices corresponding to application objects in an application topology representation) can be selected for assessment on whether the application objects corresponding to the vertices should be relocated. For example, the plan generator module 612 can select the candidate vertices based on current application objects status information (e.g., metrics 702). In some aspects, top three time-consuming application objects and top three energy consuming application objects can be selected at operation 812.

At operation 814, an offloading score can be determined for each candidate vertex. For example, for each candidate object, the plan generator module 612 can be configured to determine an offloading score associated with offloading the application object to a remote server or moving back to a mobile device. For example, if the candidate object is running locally at a mobile device, then the offloading score is $wt^{device}/t^{remote}+(1-w)E^{device}/E^{remote}$. If the candidate application object is running remotely, then the offloading score is $wt^{remote}/t^{device}+(1-w)E^{remote}/E^{device}$, where $0 \leq w \leq 1$.

At operation 816, one or more of the application objects associated with the candidate vertices can be relocated to a different network node based on the determined offloading score. For example, an application object with an offloading score greater than a threshold can be relocated (i.e., if the offloading score score$_{max}$>a, where the threshold value of a can be set to number greater than 1 (e.g., 1.5)).

In an example embodiment, the objective function 614 can be represented by the following equation for measuring time consumption by vertex $V_k$:

$$t_k = T_{k,pos_k} + \Sigma_{i=1}^{m} I_{pos_k,pos_i}[(S_{ki}+S_{ik})/R_{pos_k,pos_i}+L_{pos_k,pos_i}], \quad (1)$$

where $$I_{pos_k,pos_i} = \begin{cases} 0, & \text{if } pos_k = pos_i \\ 1, & \text{otherwise} \end{cases}.$$

In some aspects, the above equation (1) can be used to determine execution time and time needed for status/data transfer if the current vertex (i.e., application object) and its neighbors are running on different nodes. In this regard, the objective function 614, as represented by the above equation (1), is focused on execution time efficiency. In other aspects, a different variation of equation (1) can be used as an objective function, where in place of the T matrix data, energy consumption data or cost associated with running the application object at a given node can be used instead. Other objective functions using the input metrics data 702 can also be used by the plan generator module 612 in order to output the object migration recommendation 802. In some aspects, the object migration recommendation 802 can include recommendations for migrating multiple objects associated with an application.

Figure 8C:
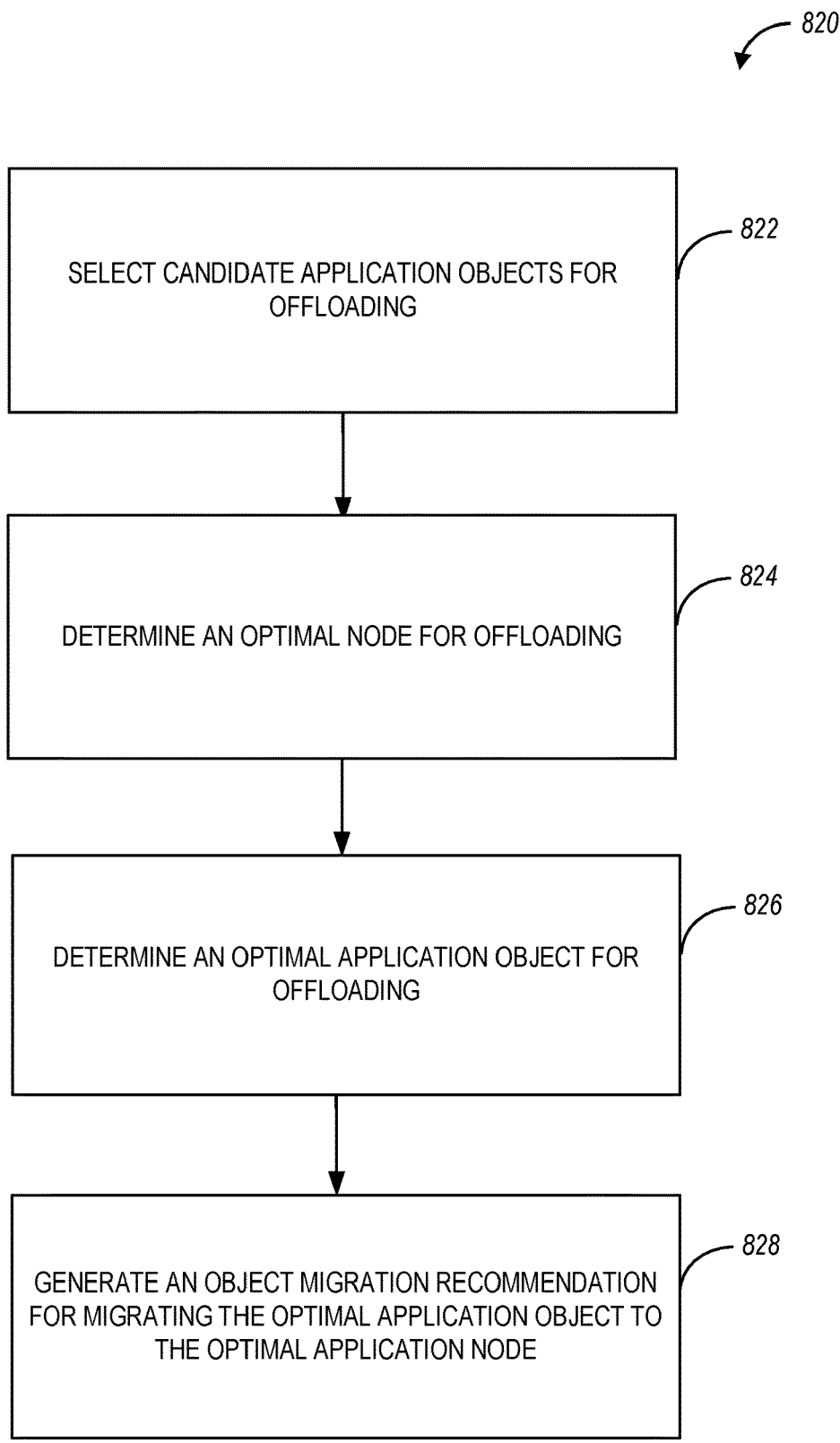
FIG. 8C is a flowchart of another method that can be performed by a plan generator in connection with generating an object migration recommendation of whether to relocate an application object, according to some example embodiments.

FIG. 8C is a flowchart of another method that can be performed by a plan generator in connection with generating an object migration recommendation of whether to relocate an application object, according to some example embodiments. The method 820 includes operations 822, 824, 826, and 828, which can be performed by the plan generator module 612 periodically, at pre-determined time intervals, to generate an application object migration recommendation 802.

At operation 822, candidate application objects can be selected from a plurality of application objects associated with an application. For example, based on the current vertices status (e.g., time consumption information), candidate application objects can be selected for offloading (e.g., top three time-consuming remote vertices from the application topology model can be selected).

At operation 824, an optimal node for offloading can be determined. For example, for each candidate application object $V_c$, an optimal node to offload the object to can be determined based on the following techniques:

(a) For each node $N_p$, the plan generator 612 can estimate execution time if vertex $V_c$ is moved to this node as follows: $t_c^{move\ to\ N_p} = T_{c,p} + \Sigma_{i=1}^{m} I_{p,pos_i}[(S_{ci}+S_{ic})/R_{p,pos_i} + L_{p,pos_i}]$.

(b) The optimal node for offloading the application object is the network node with a minimum execution time $t_c^{move} = \min t_c^{move\ to\ N_p}$.

(c) The plan generator module 612 can further calculate the following score metric: $score_c = t_c^{cur} - t_c^{move}$, which can be used in operation 826.

At operation 826, an optimal application object (from the candidate application objects) can be selected for offloading. For example, the plan generator module can select the optimal application object from the candidate application objects as the object with maximum score $score_{max} = \max score_c$. $V_{max}$ can be used to indicate the vertex (i.e., application object) to offload, and $N_{max}$ can be used to indicate the node to offload to.

At operation 828, the object migration recommendation 802 can be generated to indicate moving/migrating vertex $V_{max}$ to node $N_{max}$ if the maximum score is greater than a threshold, i.e. $score_{max} > a$, where the value of a may be set to an integer greater than zero. In aspects when a vertex is offloaded, the vector $pos[V_{max}] = N_{max}$ can be updated and $t^{cur}$ for vertex $V_{max}$ and its neighbors can also be updated using equation (1).

In an example embodiment, the location optimizer 610 can be configured to interact with the scheduler 604 and the plan generator module 612 so as to communicate object migration recommendations 802 from the plan generator module 612 to the scheduler 604 for execution.

Figure 9:
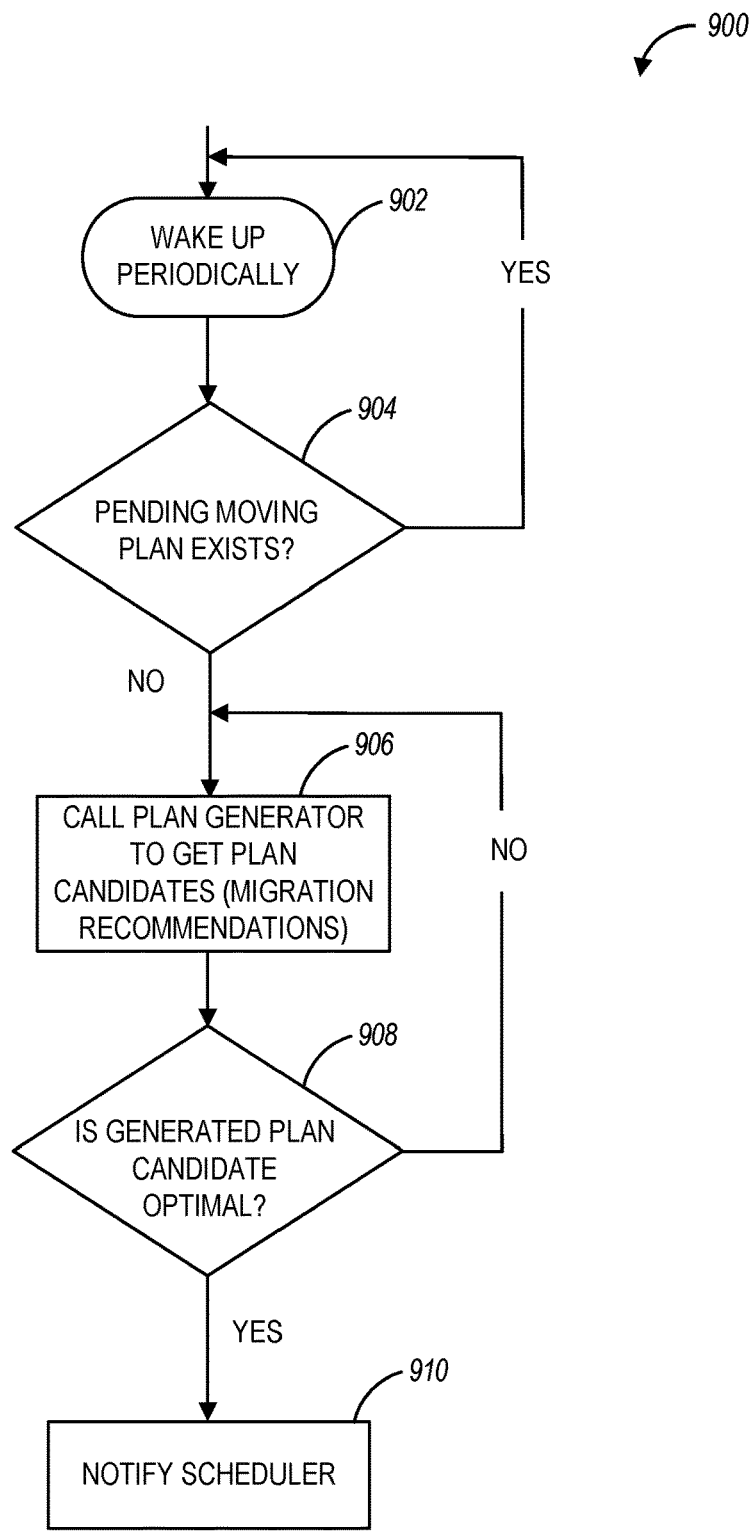
FIG. 9 is a flow diagram illustrating functionalities that can be performed by a location optimizer in connection with the system of FIG. 6, according to some example embodiments.

FIG. 9 is a flow diagram illustrating functionalities 900 that can be performed by a location optimizer 610 in connection with the system of FIG. 6, according to some example embodiments. Referring to FIG. 9, the functionalities 900 performed by the location optimizer module 610 can start at operation 902, when the location optimizer module 610 can periodically wake up from a sleep mode. At operation 904, the location optimizer module 610 can determine whether any pending object migration plans exist, as generated by the plan generator module 612. If a pending object migration recommendation exists, the location optimizer module 610 can return back to low power or sleep mode until the next periodic wake-up. If a pending object migration recommendation does not exist, the location optimizer module 610, at operation 906, can call or request from the plan generator module 612 a new object migration recommendation.

At operation 908, the location optimizer module 610 can determine whether a new object migration recommendation 802 from the plan generator module 612 is optimal. For example, in order to determine whether the new object migration recommendation is optimal, a maximum offloading score and a threshold may be used as indicated in connection with FIGS. 8B-8C. If the new object migration recommendation 802 is not optimal, processing can return to operation 906. If the new object migration recommendation 802 is optimal, processing can continue at operation 910 when the location optimizer module 610 can notify the scheduler 604 of the new recommendation so that the scheduler can proceed with execution of the migration recommendation (e.g., migrating an application object to a new network node, where the object and the node are indicated by the recommendation).

In an example embodiment, the location optimizer module 610 can perform the functions starting at operation 904 upon detecting one or more network changes, in lieu of the periodic wake-up at operation 902. For example, the location optimizer module 610 can start at operation 904 upon detecting a network availability change, power availability change in connection with one or more network nodes, network device power consumption change, and so forth.

Figure 10:
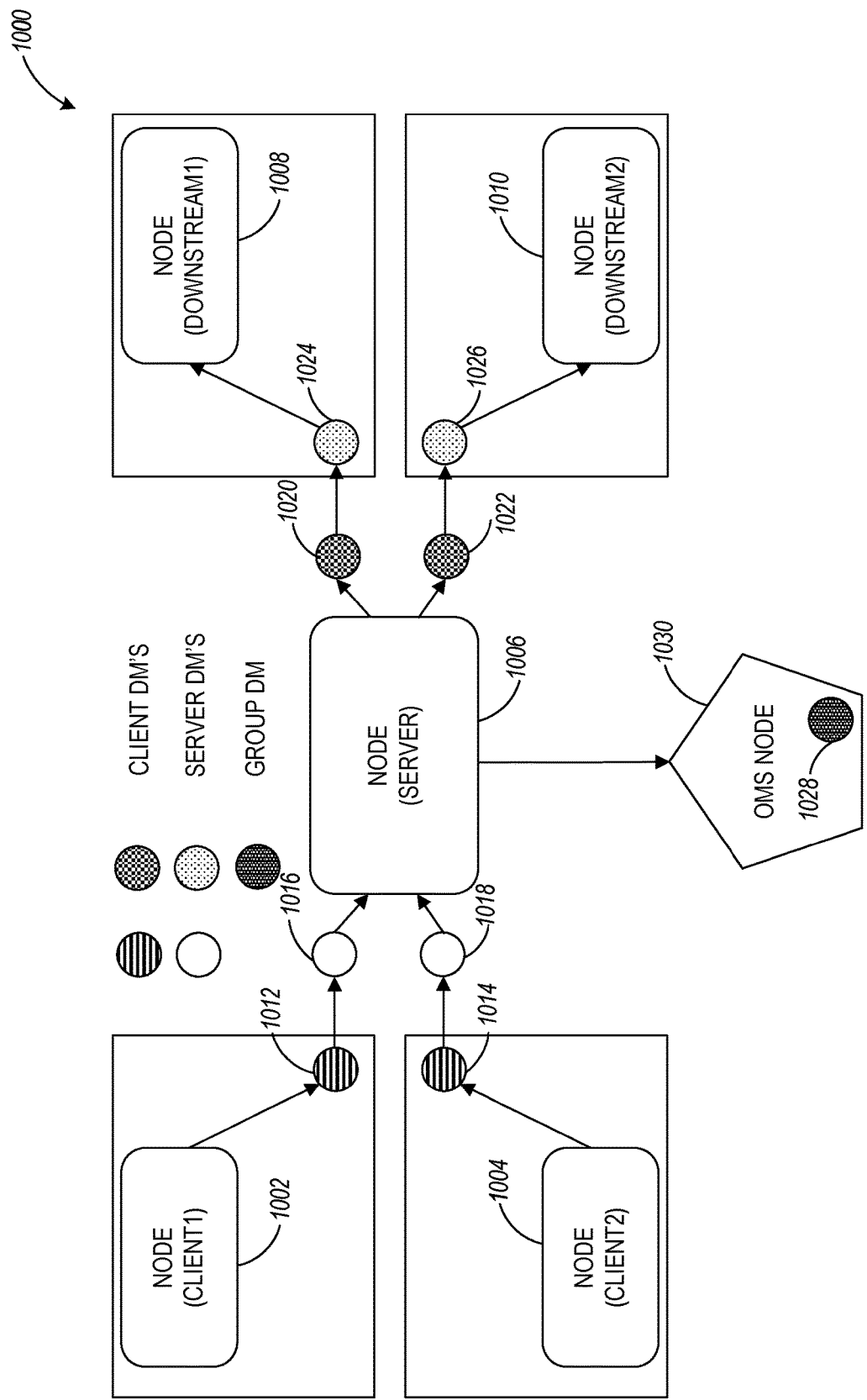
FIG. 10 is a block diagram of a network architecture that can be used for calculating application topology metrics and network topology metrics for purposes of application object placement recommendations, according to some example embodiments.

FIG. 10 is a block diagram of a network architecture 1000 that can be used for calculating application topology metrics and network topology metrics for purposes of application object placement recommendations, according to some example embodiments. Referring to FIG. 10, the network architecture 1000 can include nodes 1002, 1004, 1006, 1008, and 1010, which can be configured to host one or more application objects. The network architecture 1000 can further include an object management system (OMS) node 1030, which can be configured as a registry of all application objects and nodes within the architecture 1000. The OMS node 1030 also stores relationship information associated with the objects and the nodes, such as application topology models and resourced apology models.

The network architecture 1000 can further include a plurality of deployment managers (DMs) associated with one or more of the application objects, such as DMs 1012, 1014, 1016, 1018, 1020, 1022, 1024, 1026, and 1028. In some aspects, the DMs can include one or more client DMs (e.g., co-located on the client machine and configured to intercept all calls from the client to the server), one or more server DMs (e.g., co-located on the server machine, and through which all client calls are routed), and one or more group DMs (e.g., co-located on the same machine/s as the registry node 1030). For replicated objects, the OMS node 1030 can be configured to manage the group of replicas as a whole (e.g., monitoring the health of the group of replicas, and replacing crashed replicas when necessary). As illustrated in FIG. 10, client DMs include 1012, 1014, 1020, and 1022. Server DMs include 1016, 1018, 1024, and 1026. DM 1028 is a group DM.

As used herein, the term "deployment manager" can indicate a module that is configured to perform the functionalities of one or more of the following modules: the scheduler 604, the model generator module 608, the plan generator module 612, and the location optimizer module 610, as discussed in connection with FIG. 6.

In some aspects, network nodes within the architecture 1000 can be configured to process Remote Procedure Calls (RPCs). Procedure calls can include a request and a response. In some aspects, onRPC( ) is the procedure/method triggered in a client DM and a server DM when RPCs are intercepted between the client and the server (these nodes receive all information about the procedure call (procedure name, parameters, etc)).

In an example embodiment, the following information for a node within the architecture 1000 can be obtained using one or more of the techniques disclosed herein:

(1) Execution time of each object on the node can be measured at the server DMs (1016, 1018, 1024, and 1026) by measuring elapsed time in onRPC( ) procedure/method, and possibly subtracting elapsed downstream time measured at the client DMs (e.g., as mentioned in point (3) below).

(2) Latency and bandwidth of links from clients:

(a) Can be measured at the client DMs 1012 and 1014 (and either forwarded to the server DMs or sent directly the OMS node 1030).

(b) Can be estimated at the server DMs 1016 and 1018 (e.g., by piggybacking the local time at V(client) in the RPC calls, and subtracting it from the local time at V(server) when the RPC arrives).

(3) Latency, bandwidth and execution time to the downstream nodes 1008 and 1010:

(a) The sum of latency, transmit time and execution time can be measured at the client DMs 1020 and 1022 (in onRPC( )).

(b) Execution time can be measured at the server DMs 1024 and 1026 and returned to the client DMs 1020 and 1022 with the RPC response.

(c) Latency and transmit time can be calculated at the client DMs 1020 and 1022 by subtracting the two.

In this regard, all of the required data for generating object placement recommendations can be measured or calculated, averaged and stored by the DMs around node 1006, on that node.

In some aspects, for health checking reasons, the kernel server on the node 1006 can check in periodically with the OMS node 1030 to report its health. The OMS node 1030 includes the group DM 1028 and, consequently, data collected as per the above techniques on node 1006 can be piggybacked on periodic node health reports to the OMS node 1030, where the group DM 1028 is running. The group DM 1028 can then run a code offloading algorithm for an object and execute the required object migrations.

In some aspects and in connection with the system 600 of FIG. 6, the following modules (which are not illustrated in FIG. 6) can also be included for performing functionalities related to object placement recommendations: a network profiler that collects latency and bandwidth data; a node (machine) profiler that collects data on CPU speed; an application (object) profiler that collects data on execution time and size of data for status transfer for application objects; a statistics module configured to collect statistical data in connection with prior object relocations (e.g., how often an object has been relocated, which nodes have been used to host objects, and so forth); and a decision making module.

In some aspects, the network profiler, the node profiler, and the application profiler can be configured as modules within the system 600 that perform metrics collection. More specifically, the network profiler, the node profiler, and the application profiler can be configured to collect metrics data and save the collected metrics data in the database 606. The collected metrics data can be used by the model generator module 608 to generate the resource apology model and the application topology model.

In some aspects, initial values for latency and bandwidth between all nodes are provided by configuration file or using a heartbeat call. In some aspects, one or more of the profilers can be combined and RPC calls can be used to measure latency and throughput.

In some aspects, execution time can be measured by server DMs, and the collected data can include {V_current, Execution time, Location}. Data size, bandwidth and latency can be measured by Client DMs, and the collected data can include {V_current, V_downstream, Location_current, Location_downstream, DataSize_out, DataSize_in, Latency, Bandwidth}.

In some aspects, for decision making purposes, all collected data can be communicated to the OMS node and a minimum amount of data needed to calculate averages can be stored.

In some aspects, the statistics module can be a module within the model generator module 608. The statistics module can be configured to receive data from the profilers and updates input data matrices. When the statistics module receives tuple {V1, V2, Location1, Location2, DataSize_out, DataSize_in, Latency, Bandwidth}, it can update data size for status transfer $S_{V1,V2}$ and $S_{V2,V1}$, Latency $L_{Location1,Location2}$ and Bandwidth $R_{Location1,Location2}$ by calculating new averages. When the statistics module receives tuple {V, T, Location}, it can be configured to estimate execution time on other nodes using ratio $Time_{ki}:Time_{kj}=cpu_i:cpu_j$ and updates one row of matrix T by calculating new averages.

In some aspects, data can be averaged based on the following functionalities:

(1) By using a simple moving average (SMA) (only n latest records of data may be stored, where n indicates the window width). When a new record $D_{new}$ arrives, $SMA_{new}=SMA_{current}+D_{new}/n-D_{oldest}/n$, and $D_{oldest}$ can be removed from stored records and $D_{new}$ can be added.

(2) In aspects when phasing out impact of old events, weighted moving average (WMA) may be used (may need to store only n latest records of data, where n indicates the window width). The latest event has weight n, the second latest—n−1, etc., down to one. $WMA=[nD_{latest}+(n-1)D_{second\ latest}+\ldots+D_{oldest}]/[n+(n-1)+\ldots+1]$, where $n+(n-1)+\ldots+1=n(n+1)/2$. Let's $Total=D_{latest}+D_{second\ latest}+\ldots+D_{oldest}$. When a new record $D_{new}$ arrives, the average can be updated using the following equations: $Total_{new}=Total_{current}+D_{new}-D_{oldest}$, $Numerator_{new}=Numerator_{current}+nD_{new}-Total_{current}$, $WMA_{new}=Numerator_{new}/[n+(n-1)+\ldots+1]$, and remove $D_{oldest}$ from stored records and add $D_{new}$.

(3) In some aspects, functionalities of the decision-making module can be performed by the plan generator module 612 and the location optimizer module 610 A decision making module can be configured to use data produced by the statistics module, periodically update current time consumption for each application object, checks three top time consuming nodes, and makes object offloading decisions. In other words, an output of the decision-making module can be the same as the object placement recommendation generated by the plan generator module 612.

Figure 11:
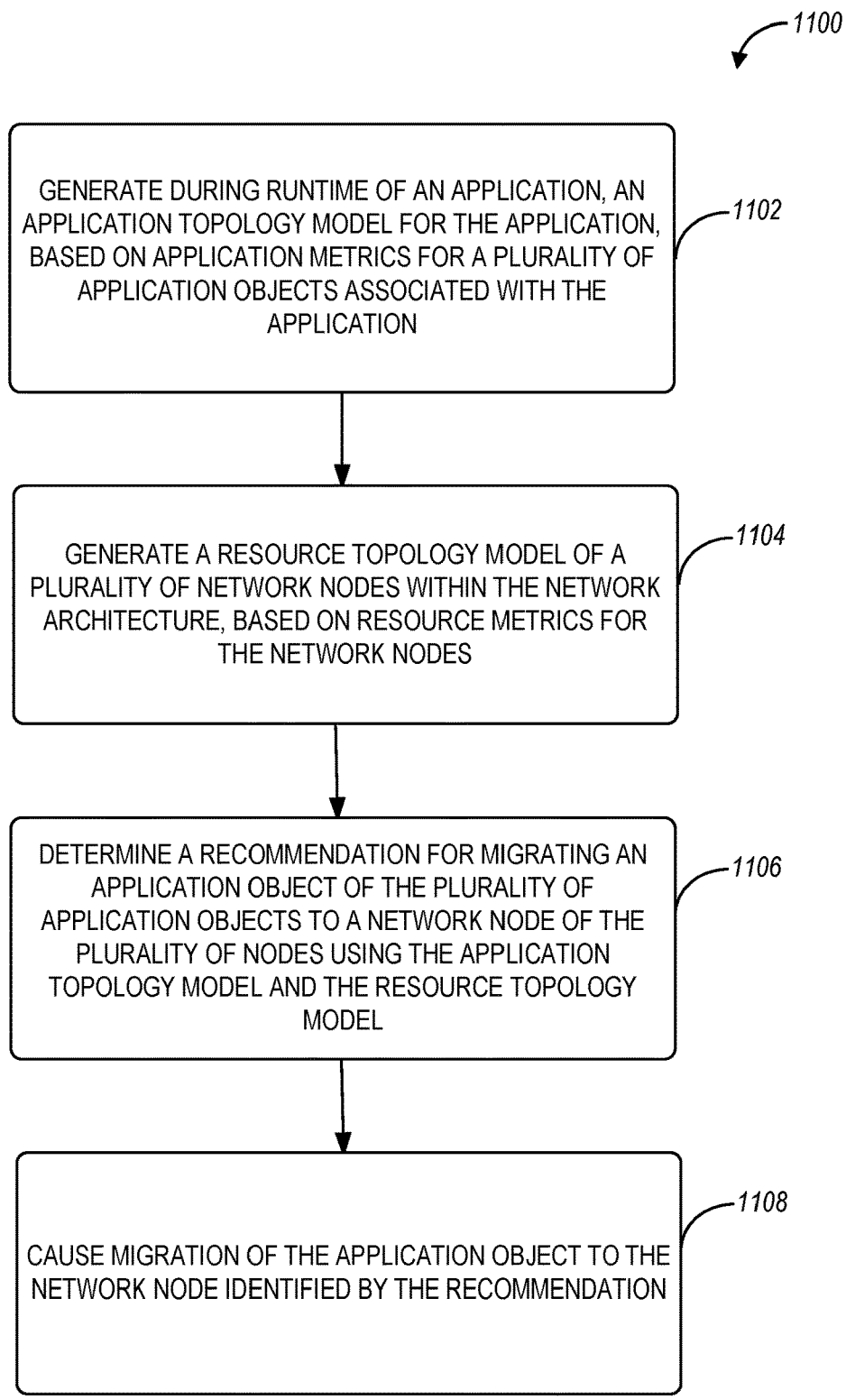
FIG. 11 is a flowchart of a method suitable for of a plurality of application objects of an application within a network architecture, according to some example embodiments.

FIG. 11 is a flowchart of a method suitable for of a plurality of application objects of an application within a network architecture, according to some example embodiments. The method 1100 includes operations 1102, 1104, 1106, and 1108. By way of example and not limitation, the method 1100 is described as being performed by the device 1300 using the modules 1360, 1365, and 1370 of FIG. 13 or any of the modules illustrated in connection with FIG. 6-FIG. 8A.

At operation 1102, an application topology model (e.g., 708) for an application (e.g., 602) is generated during runtime of the application based on application metrics for the plurality of application objects. For example, the model generator module 608 generates the application topology model 708 based on the input metrics data 702. At operation 1104, a resource topology model of a plurality of network nodes within the network architecture is generated based on resource metrics for the network nodes. For example, the model generator module 608 also generates the resource topology model 706 based on the input metrics data 702. At operation 1106, a recommendation is determined for migrating an application object of the plurality of application objects to a network node of the plurality of network nodes using the application topology model and the resource topology model. The recommendation can identify the application object and the network node. For example, the plan generator module 612 generates the object migration recommendation 802 based on the application topology model 708 and the resource topology model 706 (e.g., as described in connection with FIGS. 8A-8C), where the recommendation 802 identifies the application object and the node that the object can be migrated to. At operation 1108, migration of the application object to the network node identified by the recommendation can take place. For example, the object migration recommendation 802 can be communicated to the scheduler 604, and the scheduler 604 can cause migration of the application object to the network node identified by the recommendation 802.

Figure 12:
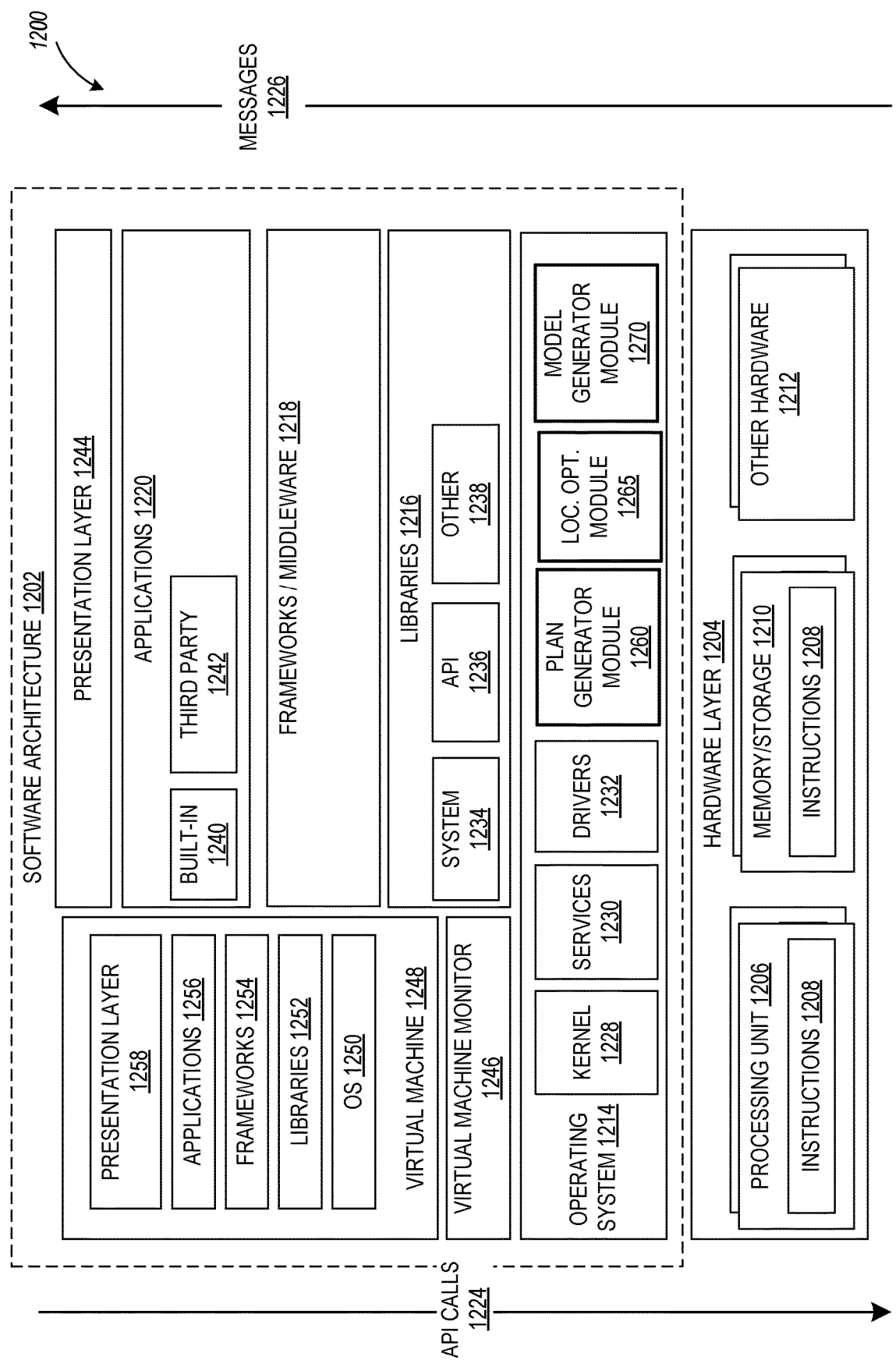
FIG. 12 is a block diagram illustrating a representative software architecture, which may be used in conjunction with various device hardware described herein, according to some example embodiments.

FIG. 12 is a block diagram illustrating a representative software architecture 1200, which may be used in conjunction with various device hardware described herein, according to some example embodiments. FIG. 12 is merely a non-limiting example of a software architecture 1202 and it will be appreciated that many other architectures may be implemented to facilitate the functionality described herein. The software architecture 1202 may be executing on hardware such as device 1300 of FIG. 13 that includes, among other things, processor 1305, memory 1310, storage 1315 and 1320, and I/O components 1325 and 1330. A representative hardware layer 1204 is illustrated and can represent, for example, the device 1300 of FIG. 13. The representative hardware layer 1204 comprises one or more processing units 1206 having associated executable instructions 1208. Executable instructions 1208 represent the executable instructions of the software architecture 1202, including implementation of the methods, modules and so forth of FIGS. 1-11. Hardware layer 1204 also includes memory and/or storage modules 1210, which also have executable instructions 1208. Hardware layer 1204 may also comprise other hardware 1212, which represents any other hardware of the hardware layer 1204, such as the other hardware illustrated as part of device 1300.

In the example architecture of FIG. 12, the software architecture 1202 may be conceptualized as a stack of layers where each layer provides particular functionality. For example, the software architecture 1202 may include layers such as an operating system 1214, libraries 1216, frameworks/middleware 1218, applications 1220 and presentation layer 1244. Operationally, the applications 1220 and/or other components within the layers may invoke application programming interface (API) calls 1224 through the software stack and receive a response, returned values, and so forth illustrated as messages 1226 in response to the API calls 1224. The layers illustrated in FIG. 12 are representative in nature and not all software architectures 1202 have all layers. For example, some mobile or special purpose operating systems may not provide a frameworks/middleware 1218, while others may provide such a layer. Other software architectures may include additional or different layers.

The operating system 1214 may manage hardware resources and provide common services. The operating system 1214 may include, for example, a kernel 1228, services 1230, drivers 1232, a plan generator module 1260, a location optimizer module 1265, and a model generator module 1270. The kernel 1228 may act as an abstraction layer between the hardware and the other software layers. For example, the kernel 1228 may be responsible for memory management, processor management (e.g., scheduling), component management, networking, security settings, and so on. The services 1230 may provide other common services for the other software layers. The drivers 1232 may be responsible for controlling or interfacing with the underlying hardware. For instance, the drivers 1232 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

In some aspects, the plan generator module 1260, the location optimizer module 1265, and the model generator module 1270 can perform functionalities similar to the functionalities performed by the plan generator module 612, the location optimizer module 610, and the model generator module 608, respectively, as described in connection with FIGS. 1-9.

The libraries 1216 may provide a common infrastructure that may be utilized by the applications 1220 and/or other components and/or layers. The libraries 1216 typically provide functionality that allows other software modules to perform tasks in an easier fashion than to interface directly with the underlying operating system 1214 functionality (e.g., kernel 1228, services 1230, drivers 1232, and/or modules 1260-1270). The libraries 1216 may include system libraries 1234 (e.g., C standard library) that may provide functions such as memory allocation functions, string manipulation functions, mathematic functions, and the like. In addition, the libraries 1216 may include API libraries 1236 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1216 may also include a wide variety of other libraries 1238 to provide many other APIs to the applications 1220 and other software components/modules.

The frameworks/middleware 1218 (also sometimes referred to as middleware) may provide a higher-level common infrastructure that may be utilized by the applications 1220 and/or other software components/modules. For example, the frameworks/middleware 1218 may provide various graphic user interface (GUI) functions, high-level resource management, high-level location services, and so forth. The frameworks/middleware 1218 may provide a broad spectrum of other APIs that may be utilized by the applications 1220 and/or other software components/modules, some of which may be specific to a particular operating system 814 or platform.

The applications 1220 include built-in applications 1240 and/or third-party applications 1242. Examples of representative built-in applications 1240 may include, but are not limited to, a contacts application, a browser application, a book reader application, a location application, a media application, a messaging application, and/or a game application. Third-party applications 1242 may include any of the built-in applications 1240 as well as a broad assortment of other applications. In a specific example, the third-party application 1242 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party application 1242 may invoke the API calls 1224 provided by the mobile operating system such as operating system 1214 to facilitate functionality described herein.

The applications 1220 may utilize built-in operating system functions (e.g., kernel 1228, services 1230, drivers 1232, and/or modules 1260-1270), libraries (e.g., system libraries 1234, API libraries 1236, and other libraries 1238), and frameworks/middleware 1218 to create user interfaces to interact with users of the system. Alternatively, or additionally, in some systems, interactions with a user may occur through a presentation layer, such as presentation layer 1244. In these systems, the application/module "logic" can be separated from the aspects of the application/module that interact with a user.

Some software architectures utilize virtual machines. In the example of FIG. 12, this is illustrated by virtual machine 1248. A virtual machine creates a software environment where applications/modules can execute as if they were executing on a hardware machine (such as the device 900 of FIG. 9, for example). A virtual machine 1248 is hosted by a host operating system (i.e., operating system 1214) and typically, although not always, has a virtual machine monitor 1246, which manages the operation of the virtual machine 1248 as well as the interface with the host operating system (i.e., operating system 1214). A software architecture 1202 executes within the virtual machine 1248 such as an operating system 1250, libraries 1252, frameworks/middleware 1254, applications 1256, and/or presentation layer 1258. These layers of software architecture executing within the virtual machine 1248 can be the same as corresponding layers previously described or may be different.

Figure 13:
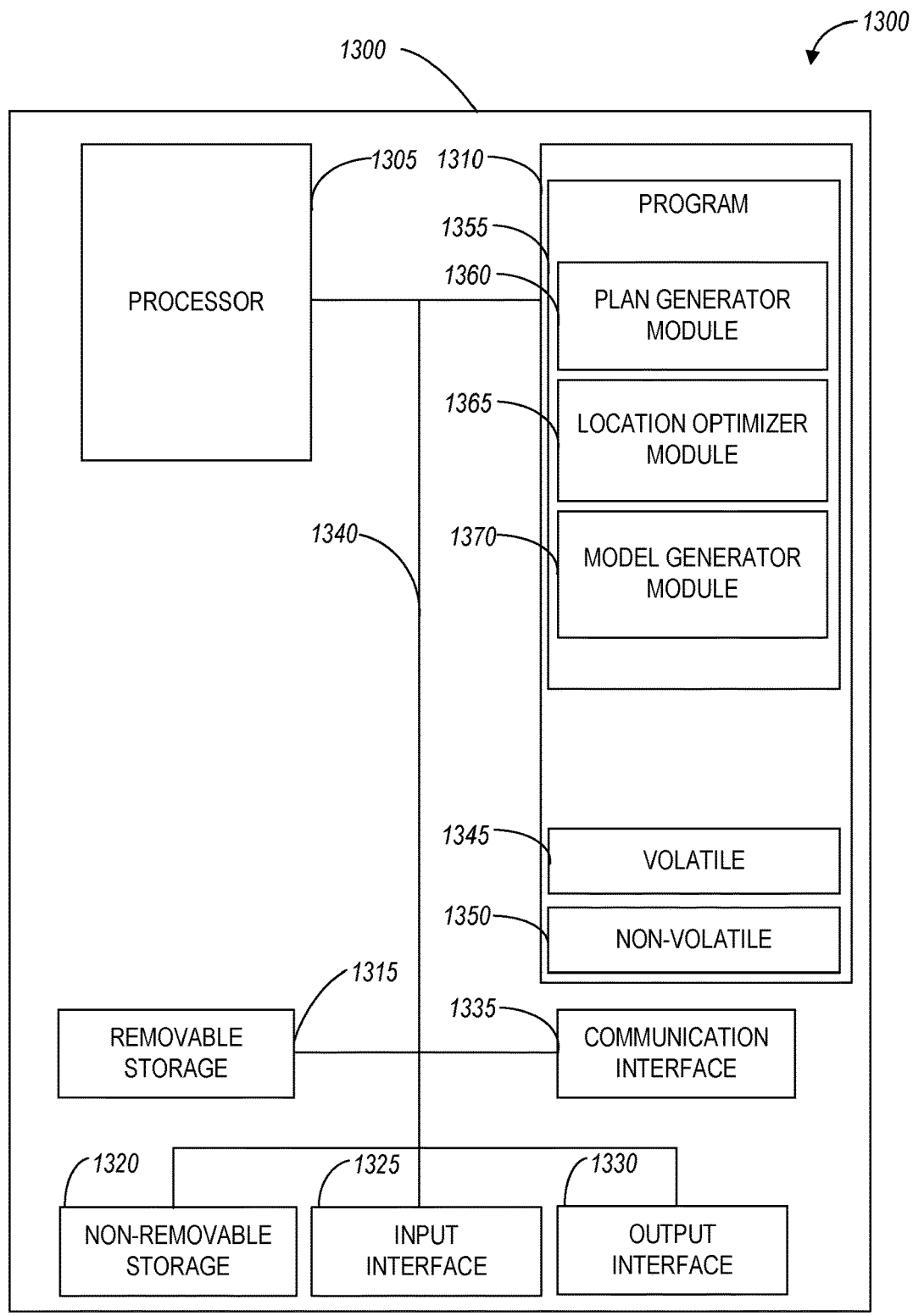
FIG. 13 is a block diagram illustrating circuitry for a device that implements algorithms and performs methods, according to some example embodiments.

FIG. 13 is a block diagram illustrating circuitry for a device that implements algorithms and performs methods, according to some example embodiments. All components need not be used in various embodiments. For example, clients, servers, and cloud-based network devices may each use a different set of components, or in the case of servers for example, larger storage devices.

One example computing device in the form of a computer 1300 (also referred to as computing device 1300, computer system 1300, or computer 1300) may include a processor 1305, memory storage 1310, removable storage 1315, non-removable storage 1320, input interface 1325, output interface 1330, and communication interface 1335, all connected by a bus 1340. Although the example computing device is illustrated and described as the computer 1300, the computing device may be in different forms in different embodiments.

The memory storage 1310 may include volatile memory 1345 and non-volatile memory 1350 and may store a program 1355. The computer 1300 may include—or have access to a computing environment that includes—a variety of computer-readable media, such as the volatile memory 1345, the non-volatile memory 1350, the removable storage 1315, and the non-removable storage 1320. Computer storage includes random-access memory (RAM), read-only memory (ROM), erasable programmable read-only memory (EPROM) and electrically erasable programmable read-only memory (EEPROM), flash memory or other memory technologies, compact disc read-only memory (CD ROM), digital versatile disks (DVD) or other optical disk storage, magnetic cassettes, magnetic tape, magnetic disk storage or other magnetic storage devices, or any other medium capable of storing computer-readable instructions.

Computer-readable instructions stored on a computer-readable medium (e.g., the program 1355 stored in the memory 1310) are executable by the processor 1305 of the computer 1300. A hard drive, CD-ROM, and RAM are some examples of articles including a non-transitory computer-readable medium such as a storage device. The terms "computer-readable medium" and "storage device" do not include carrier waves to the extent that carrier waves are deemed too transitory. "Computer-readable non-transitory media" includes all types of computer-readable media, including magnetic storage media, optical storage media, flash media, and solid-state storage media. It should be understood that software can be installed in and sold with a computer. Alternatively, the software can be obtained and loaded into the computer, including obtaining the software through a physical medium or distribution system, including, for example, from a server owned by the software creator or from a server not owned but used by the software creator. The software can be stored on a server for distribution over the Internet, for example. As used herein, the terms "computer-readable medium" and "machine-readable medium" are interchangeable.

The program 1355 may utilize one or more modules that can perform functions in connection with placement of a plurality of application objects of an application within a network architecture. For example, the program 1355 can include a plan generator module 1360, a location optimizer module 1365, and a model generator module 1370. The plan generator module 1360, the location optimizer module 1365, and the model generator module 1370 may be the same as (and perform the same functionalities described herein as) the plan generator module 612, the location optimizer module 610, and the model generator module 608, respectively, as discussed in connection with FIG. 6.

Any one or more of the modules described herein may be implemented using hardware (e.g., a processor of a machine, an application-specific integrated circuit (ASIC), field-programmable gate array (FPGA), or any suitable combination thereof). Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

In some aspects, one or more of the modules 1360-1370 can be integrated as a single module, performing the corresponding functions of the integrated modules.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

It should be further understood that software including one or more computer-executable instructions that facilitate processing and operations as described above with reference to any one or all of steps of the disclosure can be installed in and sold with one or more computing devices consistent with the disclosure. Alternatively, the software can be obtained and loaded into one or more computing devices, including obtaining the software through physical medium or distribution system, including, for example, from a server owned by the software creator or from a server not owned but used by the software creator. The software can be stored on a server for distribution over the Internet, for example.

Also, it will be understood by one skilled in the art that this disclosure is not limited in its application to the details of construction and the arrangement of components set forth in the description or illustrated in the drawings. The embodiments herein are capable of other embodiments, and capable of being practiced or carried out in various ways. Also, it will be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings. Further, terms such as up, down, bottom, and top are relative, and are employed to aid illustration, but are not limiting.

The components of the illustrative devices, systems and methods employed in accordance with the illustrated embodiments can be implemented, at least in part, in digital electronic circuitry, analog electronic circuitry, or in computer hardware, firmware, software, or in combinations of them. These components can be implemented, for example, as a computer program product such as a computer program, program code or computer instructions tangibly embodied in an information carrier, or in a machine-readable storage device, for execution by, or to control the operation of, data processing apparatus such as a programmable processor, a computer, or multiple computers.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network. Also, functional programs, codes, and code segments for accomplishing the techniques described herein can be easily construed as within the scope of the claims by programmers skilled in the art to which the techniques described herein pertain. Method steps associated with the illustrative embodiments can be performed by one or more programmable processors executing a computer program, code or instructions to perform functions (e.g., by operating on input data and/or generating an output). Method steps can also be performed by, and apparatus for performing the methods can be implemented as, special purpose logic circuitry, e.g., an FPGA (field programmable gate array) or an ASIC (application-specific integrated circuit), for example.

The various illustrative logical blocks, modules, and circuits described in connection with the embodiments disclosed herein may be implemented or performed with a general-purpose processor, a digital signal processor (DSP), an ASIC, a FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Processors suitable for the execution of a computer program include, by way of example, both general and special purpose microprocessors, and any one or more processors of any kind of digital computer. Generally, a processor will receive instructions and data from a read-only memory or a random-access memory or both. The required elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example, semiconductor memory devices, e.g., electrically programmable read-only memory or ROM (EPROM), electrically erasable programmable ROM (EEPROM), flash memory devices, and data storage disks (e.g., magnetic disks, internal hard disks, or removable disks, magneto-optical disks, and CD-ROM and DVD-ROM disks). The processor and the memory can be supplemented by, or incorporated in special purpose logic circuitry.

Those of skill in the art understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

As used herein, "machine-readable medium" (or "computer-readable medium") means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store processor instructions. The term "machine-readable medium" shall also be taken to include any medium, or combination of multiple media, that is capable of storing instructions for execution by one or more processors 1305, such that the instructions, when executed by one or more processors 1305, cause the one or more processors 1305 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" as used herein excludes signals per se.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

Although the present disclosure has been described with reference to specific features and embodiments thereof, it is evident that various modifications and combinations can be made thereto without departing from the scope of the disclosure. For example, other components may be added to, or removed from, the described systems. The specification and drawings are, accordingly, to be regarded simply as an illustration of the disclosure as defined by the appended claims, and are contemplated to cover any and all modifications, variations, combinations or equivalents that fall within the scope of the present disclosure. Other aspects may be within the scope of the following claims.

What is claimed is:

1. A computer-implemented method for placement of a plurality of application objects of an application within a network architecture, the method comprising:
generating during runtime of the application, an application topology model for the application, based on application metrics for the plurality of application objects of the application, the application metrics identifying the plurality of application objects and one or more directional communication links between at least two application objects of the plurality of application objects, and the application topology model indicating the one or more directional communication links and including an execution time matrix indicating execution times for each of the plurality of application objects when executed at a corresponding node of a plurality of network nodes within the network architecture;
generating a resource topology model of the plurality of network nodes within the network architecture, based on resource metrics for the network nodes;
determining a recommendation for migrating an application object of the plurality of application objects to a network node of the plurality of network nodes using the application topology model and the resource topology model, the recommendation identifying the application object and the network node; and
causing migration of the application object to the network node identified by the recommendation.

2. The computer-implemented method of claim 1, wherein the application topology model further comprises:
a data size matrix indicating size of data transferred between at least two application objects of the plurality of application objects.

3. The computer-implemented method of claim 2, wherein the resource topology model comprises:
a latency matrix indicating latency associated with a plurality of communication links, each communication link coupling two network nodes of the plurality of network nodes; and
a transfer rate matrix indicating bandwidth information associated with the plurality of communication links.

4. The computer-implemented method of claim 3, further comprising:
retrieving an objective function indicative of an optimization target for the placement of the plurality of application objects.

5. The computer-implemented method of claim 4, wherein the optimization target is at least one of the following:
application object time consumption associated with execution time of the plurality of application objects; and
application object energy consumption associated with energy consumed when the plurality of application objects run at corresponding network nodes of the plurality of network nodes.

6. The computer-implemented method of claim 3, further comprising:
selecting the application object of the plurality of application objects based on the execution time matrix.

7. The computer-implemented method of claim 6, further comprising:
determining a plurality of time consumption values for the selected application object, each of the time consumption values indicating time consumption when the selected application object is executed at a corresponding node of the plurality of network nodes.

8. The computer-implemented method of claim 7, further comprising:
selecting the network node of the plurality of network nodes for the migration based on a minimum time consumption value of the plurality of time consumption values; and
generating the recommendation for migrating the application object from running on a current node to the selected network node.

9. The computer-implemented method of claim 1, further comprising:
detecting a network configuration change associated with one or more of the network nodes within the network architecture.

10. The computer-implemented method of claim 9, further comprising:
generating an updated application topology model for the application and an updated resource topology model of the plurality of network nodes, based on the detected network configuration change; and
providing an updated recommendation for migrating the application object based on the updated application topology model and the updated resource topology model.

11. The computer-implemented method of claim 9, wherein the network configuration change includes at least one of the following: a network availability change and power consumption configuration change for at least one of the plurality of network nodes within the network architecture.

12. A non-transitory computer-readable medium storing computer instruction for placement of a plurality of application objects of an application within a network architecture, wherein the instructions when executed by one or more processors, cause the one or more processors to perform steps of:
generating during runtime of the application, an application topology model for the application, based on application metrics for the plurality of application objects of the application, the application metrics identifying the plurality of application objects and one or more directional communication links between at least two application objects of the plurality of application objects, and the application topology model indicating the one or more directional communication links and including an execution time matrix indicating execution times for each of the plurality of application objects when executed at a corresponding node of a plurality of network nodes within the network architecture;
generating a resource topology model of the plurality of network nodes within the network architecture, based on resource metrics for the network nodes;
determining a recommendation for migrating an application object of the plurality of application objects to a network node of the plurality of network nodes using the application topology model and the resource topology model, the recommendation identifying the application object and the network node; and causing migration of the application object to the network node identified by the recommendation.

13. A system comprising:

a memory that stores instructions; and one or more processors in communication with the memory, wherein the one or more processors execute the instructions to:

generate an application topology model for an application, based on application metrics for a plurality of application objects of the application, the application metrics identifying the plurality of application objects and one or more directional communication links between at least two application objects of the plurality of application objects, and the application topology model indicating the one or more directional communication links and including an execution time matrix indicating execution times for each of the plurality of application objects when executed at a corresponding node of a plurality of network nodes within a network architecture;

generate a resource topology model of the plurality of network nodes within a network architecture, based on resource metrics for the network nodes;

determine a recommendation for migrating an application object of the plurality of application objects to a network node of the plurality of network nodes using the application topology model and the resource topology model, the recommendation identifying the application object and the network node; and cause migration of the application object to the network node identified by the recommendation.

14. The system of claim 13, wherein the application topology model further comprises:

a data size matrix indicating size of data transferred between at least two application objects of the plurality of application objects.

15. The system of claim 14, wherein the resource topology model comprises:

a latency matrix indicating latency associated with a plurality of communication links, each communication link coupling two network nodes of the plurality of network nodes; and a transfer rate matrix indicating bandwidth information associated with the plurality of communication links.

16. The system of claim 15, wherein the one or more processors execute the instructions to:

retrieve an objective function indicative of an optimization target for placement of the plurality of application objects.

17. The system of claim 16, wherein the optimization target is at least one of the following:

application object time consumption associated with execution time of the plurality of application objects; and application object energy consumption associated with energy consumed when the plurality of application objects run at corresponding network nodes of the plurality of network nodes.

18. The system of claim 15, wherein the one or more processors execute the instructions to:

select the application object of the plurality of application objects for the migration based on the execution time matrix.

19. The system of claim 18, wherein the one or more processors execute the instructions to:

determine a plurality of time consumption values for the selected application object, each of the time consumption values indicating time consumption when the selected application object is executed at a corresponding node of the plurality of network nodes.

20. The system of claim 19, wherein the one or more processors execute the instructions to:

select the network node of the plurality of network nodes for the migration based on a minimum time consumption value of the plurality of time consumption values; and generate the recommendation for migrating the application object from running on a current node to the selected network node.

* * * * *

UNITED STATES PATENT AND TRADEMARK OFFICE
CERTIFICATE OF CORRECTION

PATENT NO. : 11,671,317 B2  
APPLICATION NO. : 15/929317  
DATED : June 6, 2023  
INVENTOR(S) : Zhuo et al.

Page 1 of 1

It is certified that error appears in the above-identified patent and that said Letters Patent is hereby corrected as shown below:

On the Title Page

Item (71), in "Applicant", in Column 1, Line 2, after "Gui'an", insert --New District--

Signed and Sealed this
Twenty-fifth Day of July, 2023

Katherine Kelly Vidal
*Director of the United States Patent and Trademark Office*